United States Patent
Raghunathan et al.

(10) Patent No.: US 11,883,962 B2
(45) Date of Patent: Jan. 30, 2024

(54) OBJECT MANIPULATION WITH COLLISION AVOIDANCE USING COMPLEMENTARITY CONSTRAINTS

(71) Applicant: Mitsubishi Electric Research Laboratories, Inc., Cambridge, MA (US)

(72) Inventors: Arvind Raghunathan, Cambridge, MA (US); Devesh Jha, Cambridge, MA (US); Diego Romeres, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 288 days.

(21) Appl. No.: 17/333,530

(22) Filed: May 28, 2021

(65) Prior Publication Data
US 2022/0379478 A1 Dec. 1, 2022

(51) Int. Cl.
*B25J 9/16* (2006.01)
(52) U.S. Cl.
CPC .............. *B25J 9/1676* (2013.01); *B25J 9/163* (2013.01); *B25J 9/1666* (2013.01); *G05B 2219/40476* (2013.01); *G05B 2219/40517* (2013.01)
(58) Field of Classification Search
CPC ........ B25J 9/1676; B25J 9/163; B25J 9/1666; G05B 2219/40476; G05B 2219/40517; G05B 2219/40475
See application file for complete search history.

(56) References Cited

U.S. PATENT DOCUMENTS

| | | | | |
|---|---|---|---|---|
| 9,981,383 | B1* | 5/2018 | Nagarajan | B25J 9/1666 |
| 2012/0265342 | A1* | 10/2012 | Kumiya | B25J 9/1676 |
| | | | | 700/255 |
| 2019/0039242 | A1* | 2/2019 | Fujii | G05B 19/19 |
| 2020/0086487 | A1* | 3/2020 | Johnson | B65G 1/137 |
| 2022/0204029 | A1* | 6/2022 | Chen | G06T 7/74 |

FOREIGN PATENT DOCUMENTS

CN    104155974 A  * 11/2014

OTHER PUBLICATIONS

Chakraborty, N., et al., "Complementarity-based Dynamic Simulation for Kinodynamic Motion Planning," Oct. 2009, The 2009 IEEE/RSJ International Conference on Intelligent Robots and Systems, pp. 787-794 (Year: 2009).*

(Continued)

*Primary Examiner* — Abby Y Lin
*Assistant Examiner* — Karston G. Evans
(74) *Attorney, Agent, or Firm* — Gene Vinokur; Hironori Tsukamoto

(57) ABSTRACT

A controller controls a motion of an object performing a task for changing a state of the object from a start state to an end state while avoiding collision of the object with an obstacle according to an optimal trajectory determined by solving an optimization problem of the dynamics of the object producing an optimal trajectory for performing the task subject to constraints on a solution of first-order stationary conditions modeling a minimum distance between the convex hull of the object and the convex hull of the obstacle using complementarity constraints.

13 Claims, 22 Drawing Sheets

(56) References Cited

OTHER PUBLICATIONS

Sleiman, J.P., et al., "Contact-Implicit Trajectory Optimization for Dynamic Object Manipulation," Mar. 2021, arXiv (Year: 2021).*
Nguyen, B., Trinkle, J., "Modeling non-convex configuration space using linear complementarity problems," May 2010, 2010 IEEE International Conference on Robotics and Automation, pp. 2316-2321 (Year: 2010).*
Zhang et al. "Optimization based collision avoidance" XP011849143.
Williams et al. A Geometrically exact contact model for plytopes in multigrid body simulation. XP055935262.
Anirban et al. Task space planning with complementarity constraint based obstacle avoidance. XP0819224.

\* cited by examiner

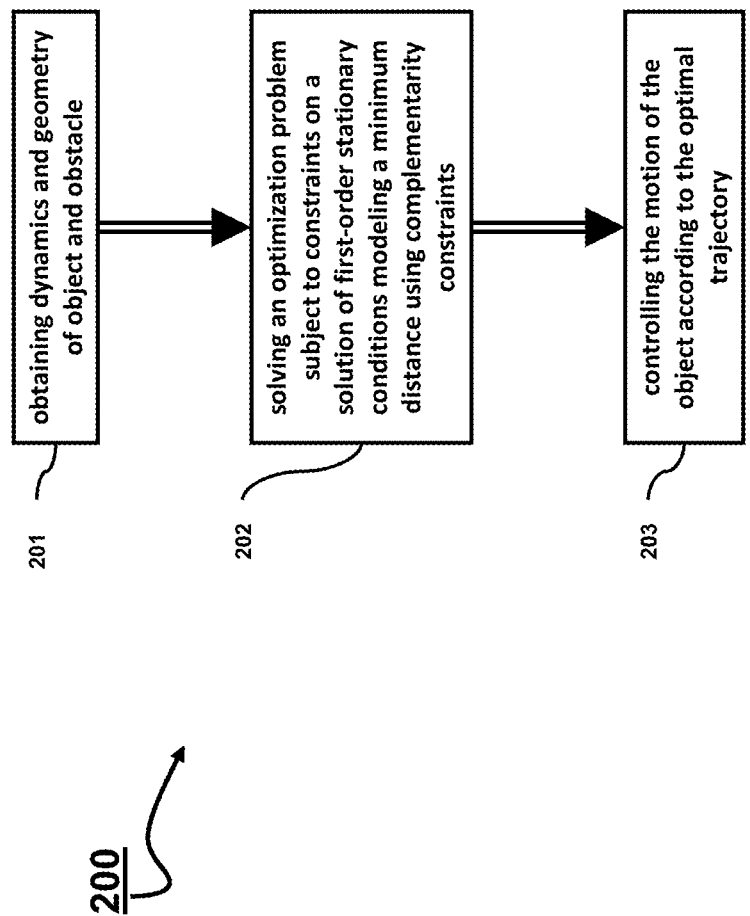

OBJECT MANIPULATION WITH COLLISION AVOIDANCE USING COMPLEMENTARITY CONSTRAINTS

TECHNICAL FIELD

The present disclosure relates to systems and methods for control and optimization of objects executing the desired task along a trajectory, and more particularly to systems and methods for object manipulation with collision avoidance using complementarity constraints.

BACKGROUND

In many practical applications, machines and objects work in environments that are often cluttered with obstacles and thus, are prone to collisions. Such environments are regarded as constrained environments. The obstacles may be other objects, machines, living things, etc. Depending on operating conditions, a system operating in such a constrained environment may encompass static and/or dynamic obstacles. Such systems may be considered as dynamical systems and can be described using nonlinear Differential Algebraic Equations (DAEs). In such systems, the trajectories to be traversed by objects need to be optimized to fit different operating scenarios. One example of such systems is a system for robotic manipulation.

Robotic systems can be configured to control a robotic device including a robotic arm (also called a manipulator). For example, the robotic system can include a controller that receives an input signal, and generates a control signal, wherein the robotic arm may provide a feedback signal to the controller. An example of such a system is an industrial assembly task where robotic manipulators are used to assembling a product while avoiding collisions with other robots and their working environment.

The planning of an optimal trajectory of a manipulator includes avoiding obstacles while minimizing time to perform the desired task, and is, in general, a difficult optimization problem. Any trajectory optimization algorithm will have to minimize the time required to perform the task while satisfying the constraints of the dynamics of the manipulator as well as the constraints due to collision avoidance. The requirement of avoiding obstacles leads to a set of non-smooth, non-convex constraints and the optimization of continuous-time dynamical systems for the set of non-smooth constraints is a challenging problem to solve. The non-smooth, non-convex constraints due to obstacle avoidance need to be enforced during trajectory generation and optimization. Also, since the optimization problem is non-convex, there are bound to exist multiple local minima but the optimization algorithms are not guaranteed to find the global minimum. As a consequence, there is no guarantee that the solution returned by such algorithms indeed avoids the obstacle. An example of such an obstacle avoidance constraint is the distance between two objects for whom collision avoidance is desired. In order to optimize the problem for obstacle avoidance, it is desired that such a distance between the objects be always non-zero. Several conventional methods formulate the trajectory planning with obstacle avoidance also as an optimization problem. For example, the method described in U.S. Pat. No. 7,248,952 formulates the trajectory planning as a mixed integer linear programming problem with distance constraints between objects formulated as an optimization problem.

A drawback of such formulation is that the distance constraint is at best once differentiable or not differentiable at all. For example, conventional trajectory planning algorithms use nonlinear programming algorithms which assume that the constraint is at least once continuously differentiable. This leads to a situation where the optimization problem for computing controls becomes non-differentiable. Hence, a judicious formulation of the obstacle avoidance constraint is required in order for the formulation to be amenable to nonlinear programming algorithms.

Accordingly, there is a need for optimization of trajectory of an object while avoiding at least one obstacle, wherein the optimization is subject to smooth constraints.

SUMMARY

Some embodiments are directed towards providing a system and a method for controlling a motion of an object performing a task changing the state of the object from a start state to an end state while avoiding collision of the object with an obstacle. The change of state of the object from start state to end state may encompass a trajectory through a sequence of states. Additionally, or alternatively, it is an object of some embodiments to optimize the trajectory of the state of the object performing the task thereby optimizing the performance of the task as a whole. Examples of such controlled objects include robotic manipulators, autonomous cars, drones etc.

Some embodiments are based on the realization that a trajectory optimization algorithm needs to satisfy several constraints for a system. These constraints could arise due to the dynamics model of the system, the state and control bounds of the systems or due to obstacle avoidance constraints. The DAEs are sufficient to represent smooth dynamical systems. Unfortunately, dynamics for some systems are not always smooth, and thus cannot be expressed entirely by DAEs. However, some embodiments are based on a realization that some non-smooth dynamics can be expressed by using complementarity conditions on certain state variables. Some examples of systems where complementarity conditions are used to express non-smooth dynamics are systems with frictional interaction, where the frictional interaction is expressed as complementarity conditions. Some embodiments are based on the realization that formulating non-smooth dynamics using complementarity conditions allow creation of optimization problems that can be solved with nonlinear programming algorithms.

Some example embodiments are based on a formulation of the obstacle avoidance constraint as a convex optimization problem. Some example embodiments are based on an understanding that obstacle avoidance must be formulated as a constraint in the optimization with sufficient smoothness. Such formulation ensures that any feasible trajectory will avoid the obstacle and the smoothness of the constraints allows to employ a nonlinear programming algorithm. Further, any local minima of the optimization formulation satisfy to avoid obstacles, thereby avoiding the need for obtaining the global minimum.

Some embodiments are based on understanding that in such a formulation to the control problem, controlling for performing a task can be thought of as a primary control problem, while collision avoidance is a subordinate control problem. The primary control problem is an optimization problem. However, the collision avoidance problem is also an optimization problem because to check for the collision between two points of the different objects of various shapes, the closest points between these objects need to be found, and the search for the closest points is an optimization, i.e., minimization, problem of the distance among all various points of the two objects. Hence, the optimal object control avoiding the collisions includes solving the nested optimization problem, i.e., optimization of a reference trajectory and optimization necessary for the collision avoidance.

Solving the nested optimization is a challenging problem by itself, but even more challenging in the context of collision avoidance applications. This is because the optimization needed for collision avoidance is an ill-posed problem. After all, multiple pairs of points of different objects can have the same distance. While it is desired to avoid collision for all pairs of points with minimal distance, this ambiguity makes the collision avoidance optimization not differentiable, which in turn may prevent the nested optimization from achieving the primary control objective.

Accordingly, it is an object of some embodiments to address the computational problem of the nested optimization of optimal control applications avoiding the collisions. Some embodiments are based on a realization that because collision avoidance optimization is subordinate to the primary control problem, its solution can be replaced with a test on the solution of the primary control problem. The property of this test is such that if the test is satisfied, the solution of the primary control optimization is collision-free for all different pairs of points of different objects. Moreover, in the context of control optimizing the change of the state of the controlled object by various differentiable techniques, such a test should depend on the state of the object in a differentiable manner. It was further realized that such a test can be defined with the help of complementarity constraints.

Some embodiments are based on a recognition that if the distance between the points of the objects is represented as a distance function of differences between all of its points, the minimum distance between the objects corresponds to the stationary points of this function. As used herein, a stationary point of a differentiable function of one variable, such as a distance, is a point on the graph of the function where the function's derivative is nonnegative along feasible directions of motion. Every first-order stationary point of such a distance function is a minimizer, and the ambiguity of the distance function suggests that such a function can have multiple stationary points. In any case, according to such a formulation, the optimal minimization problem can be replaced through a solution of first-order stationary conditions of such a distance function. Advantageously, such a solution can be found in a differentiable manner thereby, ensuring allowing the applicability of various nonlinear programming algorithms.

Some embodiments are based on another realization that the shape of the object under control and a shape of an obstacle that can cause a collision can be represented as a convex hull, such that each point in these objects is a vector of non-negative weights of vertices of the corresponding hull. Advantageously, such a representation allows separating the weights of these vectors from the state of the object. Specifically, the position of the object represented by the convex hull depends on the state, but the weights themselves defining different points in the hull are independent of the states. Such a representation makes the formulation of the distance between the points of the object and the points of the obstacle a convex problem where the weights are required to lie on a simplex. The simplex is a convex set whose elements, the weights, are nonnegative and sum to one. The convexity of the minimum distance optimization allows to reformulate using first-order stationary conditions subject to the complementarity constraints.

In such a manner, some embodiments transform the nested optimization problem into a single optimization problem subject to constraints on a solution of first-order stationary conditions modeling a minimum distance between a convex hull of the object and a convex hull of the obstacle using complementarity constraints. Representing the constraint on a minimum distance as a solution of first-order stationary conditions makes such a representation differentiable.

The transformation of the nested optimization problem into a single optimization problem requires fewer iterations which in turn consumes fewer resources in comparison to what would have been consumed by the nested problem. Thus, some example embodiments lead to a faster optimization process for which some beneficial aspects realized include significant improvement in overall resource consumption, CPU time, and clock cycles when executing the process. Such technical benefits are further magnified and get transformed into more practical benefits when the optimization problem is implemented as a part of a resource-scarce application such as autonomous driving, robots, drones, and the like.

Furthermore, some example embodiments lead to a better optimized trajectory in terms of accuracy because the underlying transformation of the problem does not have to assume or approximate much owing to the smoothness induced into the constraints. This is because expressing the constraints as complementarity conditions allows us to use tailored relaxations that allow to robustly solve using conventional optimization algorithms and thus, lead to higher quality solutions.

Some embodiments are based on the understanding that control optimization avoiding the collision can be useful for many control applications, such as robots performing assembly, parking or controlling an autonomous car, autonomous motion of drones. Particularly, some embodiments are based on the realization that formulating collision avoidance problems with complementarity constraints can be especially beneficial in robotic applications. Most robotic applications are characterized by the presence of constrained environments while dealing with challenging underlying phenomena like unilateral contacts, frictional contacts, impact, and deformation resulting in contact-rich multi-body interactions. These contact-rich, multi-body frictional interaction systems are generally described by non-smooth dynamics which can be expressed using complementarity conditions. Hence, when collision avoidance is also formulated by complementarity constraints, such a formulation allows to handle contact and collision avoidance in a unified manner.

Some beneficial aspects, among many beneficial aspects realized, is that embodiments of the present disclosure can generate continuous-time collision-free dynamic trajectories for rigid bodies without explicitly needing a collision checking/avoidance module or giving an initial feasible solution.

Some features of the embodiments of the present disclosure as described herein may be used in the automotive industry, aerospace industry, nonlinear control systems, and process engineering. Also, some features of the embodiments of the present disclosure can be used with a material-handling robot with multiple end-effectors suitable for applications in semiconductor wafer processing systems. For example, the above operations may be utilized to pick/place a wafer or substrate from/to an offset station. A sequence of a pick operation with one end-effector, followed by a place operation with another end-effector, which may be used to quickly exchange wafers/substrates at an offset station (rapid exchange operation). The robot drive unit may include one or more vertical lift mechanisms to control a vertical elevation of the robot arm, which may be used to access stations at different elevations, compensate for the vertical distance between the end-effectors of the robot arm, and facilitate material pick/place operations. Contemplated is that the robot device can utilize motor-driven ball screws, or any other suitable actuation mechanism, including, but not limited to, lead screws, linear motors, linkage mechanisms, scissor mechanisms, hydraulic actuators, pneumatic actuators, and their combinations. Noted is that with two more robot arms, the configuration can include an upper arm and lower arm, configured with a location that is one of the same plane or different plane, as the other arm.

Accordingly, one embodiment discloses a controller for controlling a motion of an object performing a task for changing a state of the object from a start state to an end state while avoiding collision of the object with an obstacle, comprising: at least one processor; and a memory having instructions stored thereon that, when executed by the at least one processor, cause the controller to: obtain data indicative of dynamics of the object and the obstacle, and geometry of the object and the obstacle, wherein the geometry of the object includes a convex shape enclosing an actual shape of the object and the geometry of the obstacle includes a convex shape enclosing an actual shape of the obstacle; solve an optimization problem of the dynamics of the object producing an optimal trajectory for performing the task subject to constraints on a solution of first-order stationary conditions modeling a minimum distance between the convex shape of the object and the convex shape of the obstacle using complementarity constraints; and control the motion of the object according to the optimal trajectory.

Another embodiment discloses a method for controlling a motion of an object performing a task changing a state of the object from a start state to an end state while avoiding collision of the object with an obstacle, wherein the method uses a processor coupled with stored instructions implementing the method, wherein the instructions, when executed by the processor carry out steps of the method, comprising: obtaining data indicative of dynamics of the object and the obstacle, and geometry of the object and the obstacle, wherein the geometry of the object includes a convex shape enclosing an actual shape of the object and the geometry of the obstacle includes a convex shape enclosing an actual shape of the obstacle; solving an optimization problem of the dynamics of the object producing an optimal trajectory for performing the task subject to constraints on a solution of first-order stationary conditions modeling a minimum distance between the convex shape of the object and the convex shape of the obstacle using complementarity constraints; and controlling the motion of the object according to the optimal trajectory.

Yet another embodiment discloses a non-transitory computer-readable storage medium embodied thereon a program executable by a processor for performing a method for controlling a motion of an object performing a task changing a state of the object from a start state to an end state while avoiding collision of the object with an obstacle, the method comprising: obtaining data indicative of dynamics of the object and the obstacle, and geometry of the object and the obstacle, wherein the geometry of the object includes a convex shape enclosing an actual shape of the object and the geometry of the obstacle includes a convex shape enclosing an actual shape of the obstacle; solving an optimization problem of the dynamics of the object producing an optimal trajectory for performing the task subject to constraints on a solution of first-order stationary conditions modeling a minimum distance between the convex shape of the object and the convex shape of the obstacle using complementarity constraints; and controlling the motion of the object according to the optimal trajectory.

BRIEF DESCRIPTION OF DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A shows a block diagram of a method for controlling a motion of an object performing a task changing the state of the object from a start state to an end state while avoiding collision of the object with an obstacle according to some embodiments.

DETAILED DESCRIPTION

Figure 1A:
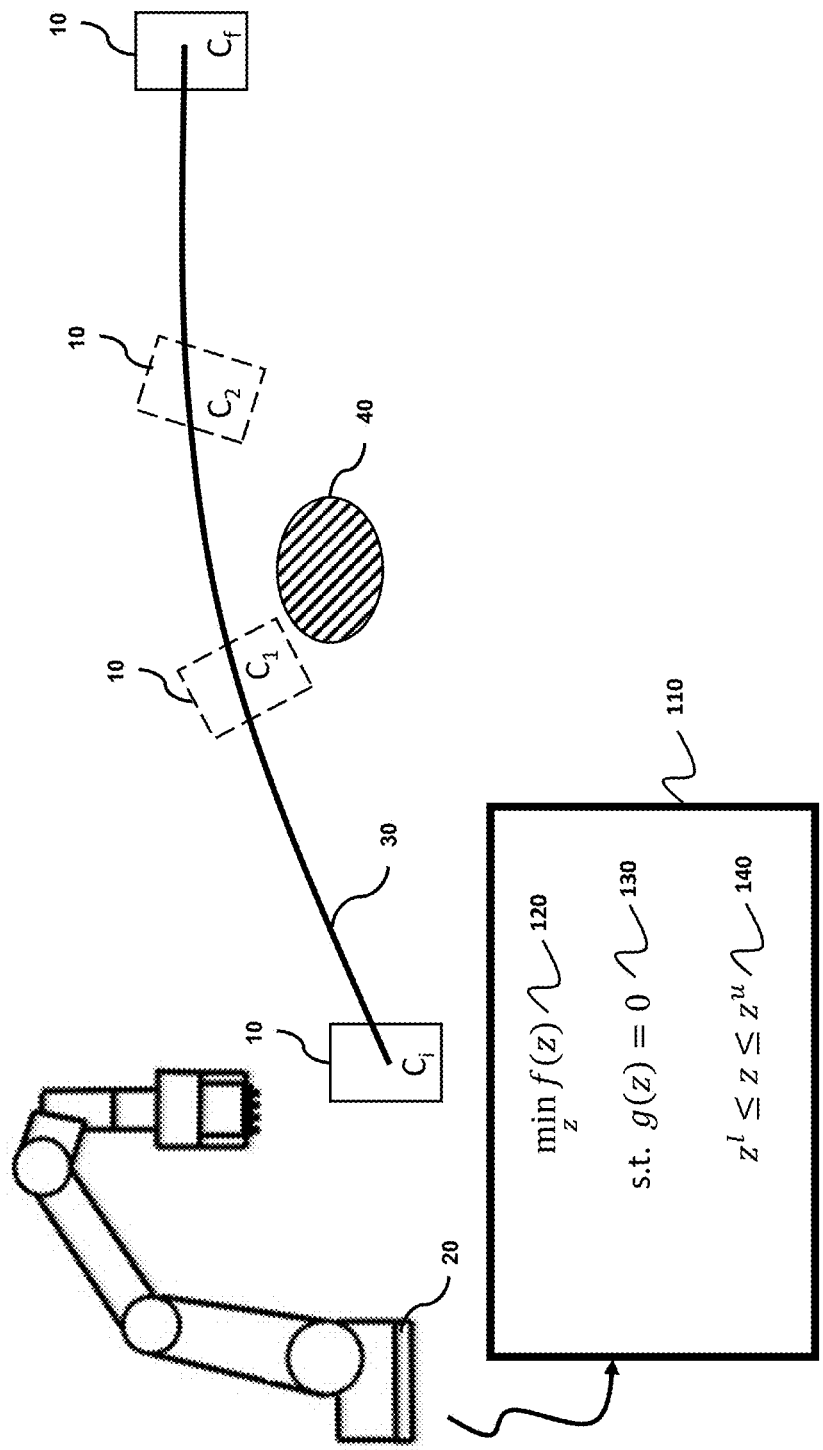
FIG. 1A is a diagram illustrating an overview of a trajectory optimization problem, according to some embodiments.

Example embodiments described herein are directed towards systems and methods for control and optimization of objects configured to move in a collision-prone trajectory. Automation of several tasks associated with everyday objects has increased manyfold over time and today automated systems have penetrated so much into day-to-day lives that they almost coexist everywhere with humans. Oftentimes, certain automated systems operate in highly cluttered environments where performing a task is highly constrained by an understanding of the surrounding environment. Particularly, such environments often comprise a large number of obstacles and the task needs to be executed in their presence while avoiding contact with them. As such, the objective of performing the task translates into performing the task without colliding with an obstacle while simultaneously achieving the desired task objective. Further, there arise scenarios where traversing the obstacles while ensuring collision avoidance requires the generation of an optimal trajectory to perform a desired task. Examples of these tasks include robotic manipulation tasks (automated assembly, robotic kitting, etc.), automated parking of vehicles, automated surveillance and deliveries by unmanned aerial vehicles, and the like.

In the context of robotic manipulation tasks, one or more robots perform manipulation tasks in such cluttered environments. The robotic systems can include a robotic arm containing an end effector or a gripper, that is used for applications including grasping, picking up, or moving objects. For instance, the robotic device can be used to complete a task or a series of tasks. Such tasks can include moving objects, such that the robotic systems can direct a robotic arm to pick up objects based on given knowledge of where objects are located within the environment. In general, the control inputs for a manipulator's arm are the motor torques that the robot has to apply at each of the joints to move to the desired pose from an initial pose.

Manipulation problems are the problems where a robot has to plan and control the desired sequence of contacts with the external environment in order to achieve the desired configuration of the object being manipulated. Planning for these tasks requires trajectory optimization with contacts while also avoiding obstacles in the environment. Some example embodiments disclose a novel method for computing trajectories that obey contact dynamics and avoid collisions. In particular, some example embodiments model both contacts and obstacle avoidance using complementarity constraints. This allows planning robotic manipulation tasks in a unified framework. Similar approaches with minor modifications are applicable to other application areas such as automated parking, automated flight of UAVs, and the like.

Some example embodiments remove the deficiencies of conventional approaches and are able to handle collision avoidance between a controlled object and obstacle, and obstacle or controlled objects more efficiently by reducing the amount of assumption made in the computation of the optimal trajectory. Some example embodiments are based on the realization that full-dimensional obstacles and controlled objects can be modeled as any convex body, such as an ellipsoid or a polytope. Additionally, some example embodiments are based on an approach that is smooth and can be handled using general nonlinear programming (NLP) algorithms.

Example embodiments disclosed herein relate to the problem of planning object control tasks in the presence of contacts and obstacles. Modeling of frictional contacts between multiple bodies leads to non-smooth dynamics because of friction and rigidity of the bodies in contact. These non-smooth phenomena can be expressed mathematically using complementarity constraints. Control of objects with frictional interaction in the presence of obstacles is challenging. The collision avoidance problem is modeled using complementarity constraints. Among several beneficial aspects of the example embodiments, some include the formulation of the collision avoidance problem becoming differentiable and allows for the use of NLP solvers and the treatment is identical for the case of object-static obstacle and object-object collision avoidance. When used in plurality, the term object may also refer to a static obstacle. These and several other aspects are described in greater detail in the subsequent portions with particular reference to the figures.

FIG. 1A is a diagram illustrating an overview of a trajectory optimization problem, according to some embodiments. An object 10 is to be controlled for example—manipulated by a robotic manipulator 20. The object control is to be planned in such a manner that trajectory 30 of the object 10 avoids any contact/collision with one or more obstacles 40 that may also exist in the environment of the object 10. The trajectory of object 10 may encompass several states ($C_i$, $C_1$, $C_2$, $C_f$) each of which designate a particular position, orientation, and form of object 10. In this regard, trajectory 30 of object 10 may define the path to be taken by object 10 transitioning between two or more states. Trajectory 30 may also correspond to a set of controls to be executed on object 10 by a controller such as the one associated with the robotic manipulator 20. The one or more obstacles 40 may be other objects in the environment of the object 10 such as bodies, living things, or even spaces that may be restricted for traversal by the object 10. In order to optimize a trajectory such as a trajectory 30, a controller generates a sequence of state and inputs to optimize the desired objective function while respecting all the constraints for a system. The requirement of avoiding obstacles leads to a set of non-convex constraints and the optimization of continuous-time dynamical systems for the set of non-convex constraints difficult problem to solve. The non-convex constraints due to obstacle avoidance need to be enforced during trajectory optimization.

Motion planning for a manipulator configured for moving an object is a recurring component in many robotic processes. For example, some motion planning exercises are for a manipulator to reach a goal state from a starting state by decomposing the full problem into two steps: kinematic planning and trajectory tracking. However, decoupling the problem into two steps restricts the quality of the solution that one can obtain in terms of optimality. In particular, when this problem is solved simultaneously, an optimization algorithm is forced to find a solution that minimizes the effort, while respecting all the constraints active on the robotic system. Amongst many beneficial aspects, the minimized efforts result in a considerable reduction in processing requirements which in turn make the overall process less resource-consuming. This, in turn, makes the process executable over low cost and less resourceful processors thereby increasing the likelihood of applying the process to such areas as autonomous driving, automatic parking, drones, and the like where onboard resource availability is always a scarcity.

Some example embodiments are based on a realization that trajectory optimization is a procedure of generating a sequence of states and inputs to optimize the desired objective function while respecting all the constraints for a system. One experimentation included a trajectory planning approach for trajectory optimization that configured the trajectory planning to use a decomposition of the problem into kinematic planning, which was followed by dynamic planning. The kinematic planning was set up to arrange a path in a configuration space of the robot while checking for possible collisions with obstacles present in the environment. However, several tests during experimentation often resulted in infeasible trajectories or trajectories which were sub-optimal and later realized to be infeasible for the dynamics. What was gained or learned, was that because the kinematic planning module did not consider the dynamics, this resulted in the planning module is not being aware of the dynamics and the control saturation limits of the system. This resulted in trajectories that saturated the control limits of the system or resulted in dynamically non-smooth (i.e., the robot often experienced a very high acceleration during movement) which proved to be undesirable. Thus, a realization of the present disclosure is the incorporation of geometric constraints as well as state and input constraints to automatically generate collision-free, optimal trajectories for a robotic system is highly desirable. This realization additionally allowed for trajectory optimization without the requirement of collision checking between the robot and the obstacles, as it is enforced as a constraint during optimization.

Some example embodiments are based on the realization that most trajectory optimization problems in the presence of state and control constraints can be solved using a non-linear optimization technique. However, the geometric constraints imposed due to the movement of the manipulator's arm in the presence of the obstacles in the environment result in non-convex, non-differentiable constraints as the minimum function are, in general, mathematically non-differentiable. In order to avoid collisions with obstacles, an optimization algorithm needs to ensure that the minimum distance of each of the links from all obstacles is always positive during the motion of the links.

Accordingly, some embodiments determine the motion trajectory by solving an optimization problem using a general nonlinear program (NLP) 110 which is defined by a nonlinear objective function 120 which is minimized subject to non-linear constraints 130, where the decision variable lies in a specified interval or set 140. The optimal decision variable is obtained within the specified bounds 140 by minimizing the objective function 120 subject to the non-linear constraints 130. It is an object of some embodiments to provide the differential solution to the NLP 110.

Figure 1B:
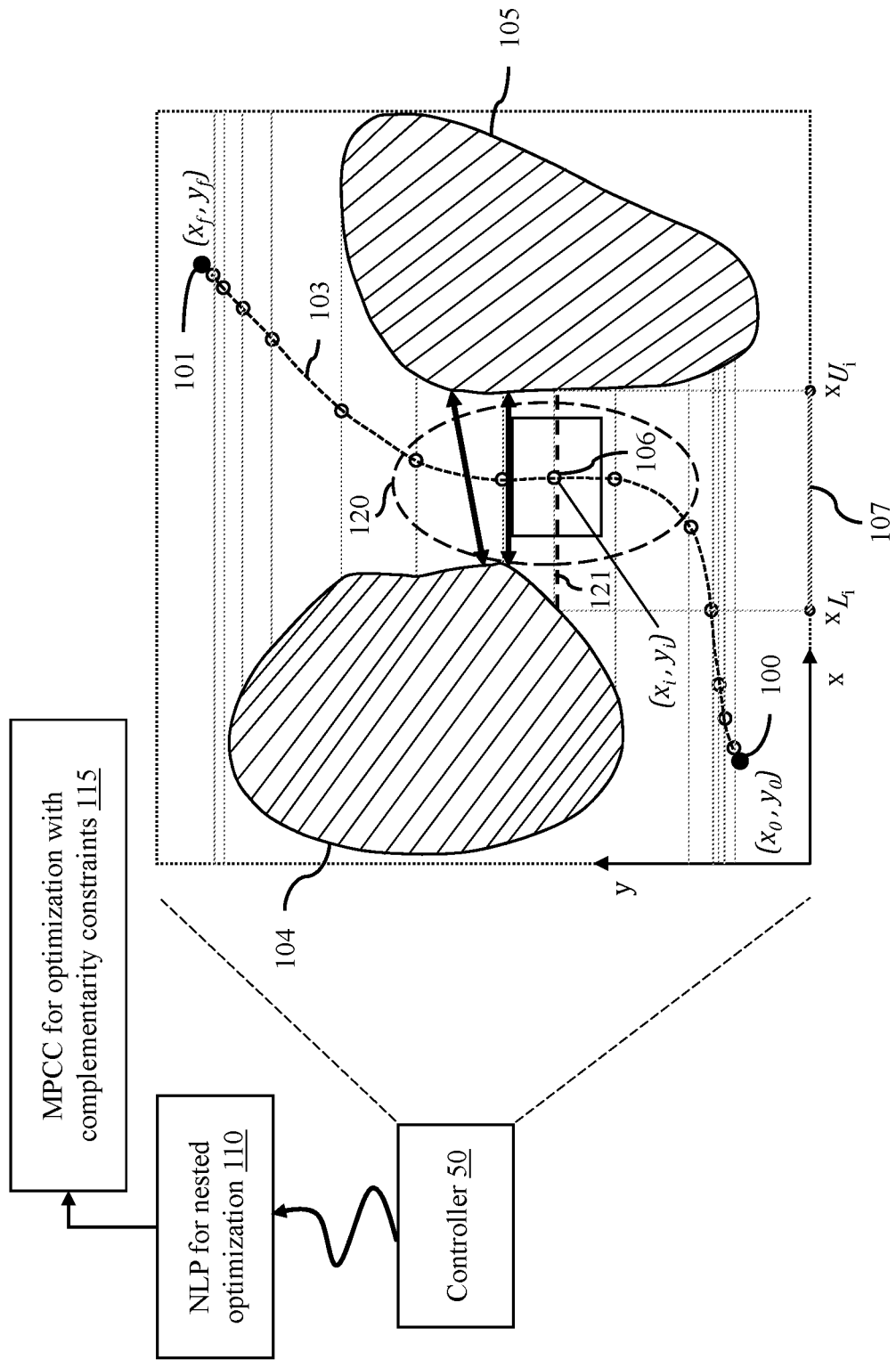
FIG. 1B is a schematic illustrating an example for trajectory planning in a plane using principles of some embodiments.

FIG. 1B is a schematic illustrating an example for trajectory planning in a plane using principles of some embodiments. For example, it is possible to solve the optimization problem by assuming that the motion of the object moving from an initial location 100 (having coordinates $x_0$, $y_0$) to a final location 101 (having coordinates $x_f$, $y_f$) in one direction (say y-direction) is fixed, and the motion in the other orthogonal direction (say x-direction) needs to be optimized. Such an assumption leads to an iterative process that consumes more time and resources and is not suitable for mission-critical applications. For example, as is shown in the example of FIG. 1B, the x motion of location 106 must satisfy the obstacle avoidance constraint, thus the motion of the location in the x-direction is limited to the short horizontal segment 121, which passes location 106 and is bounded between two obstacles 104 and 105.

Correspondingly, the x coordinate, $x_i$, must stay in interval 107, or) $(x_{L_i}, x_{U_i})$, which is the projection of segment 121 on the x-axis. Therefore, during the planning of the motion along the x-axis, the obstacle avoidance constraint is enforced locally at xi as $x_{L_i} \leq x_i \leq x_{U_i}$, which is a convex constraint on $x_i$. By performing the same operation for each of the selected locations, the obstacle avoidance constraint is converted into a convex constraint in the motion planning for the x-motion.

However, the example embodiments disclosed herein utilize the minimum distance constraint instead which takes into consideration the movement of the object along both the axes simultaneously. Such a distance constraint introduces non-differentiable constraints into the trajectory optimization problem. In some scenarios, the minimum distance constraints may be at most once differentiable that too when the minimizer is unique. However, when objects are modeled as polytopes, the uniqueness of the minimizer cannot be guaranteed. For example, as shown in FIG. 1B, the distance between the two obstacles 104 and 105 (shown as double-ended arrows) is not unique when the exact geometry of the obstacles is taken into consideration rather than considering them as point masses. For similar reasons, when the trajectory 103 of the object to be manipulated passes between the two obstacles 104 and 105, the distance between the object and any of the obstacles 104, 105 is not necessarily unique.

Thus, the usability of NLP solvers 110 for solving the trajectory problem defined using minimum distance constraints becomes a question due to the non-differentiability of those constraints as well as due to the non-guaranteed uniqueness of the minimizers of those constraints. Some example embodiments transform the non-differentiable constraint-based problem into a differentiable, complementarity conditions based optimization problem having unique minimizers.

Some embodiments are based on a recognition that if the distance between the points of the objects is represented as a distance function of differences between all of its points, the minimum distance between the objects corresponds to the stationary points of this function. As used herein, a stationary point of a differentiable function of one variable, such as a distance, is a point on the graph of the function where the function's derivative is nonnegative along feasible directions of motion. Every first-order stationary point of such a distance function is a minimizer, and the ambiguity of the distance function suggests that such a function can have multiple stationary points. In any case, according to such a formulation, the optimal minimization problem can be replaced through a solution of first-order stationary conditions of such a distance function. Advantageously, such a solution can be found in a differentiable manner thereby, ensuring allowing the applicability of various nonlinear programming algorithms.

Some embodiments are based on another realization that the shape of the object under control and a shape of an obstacle that can cause a collision can be represented as a convex hull, such that each point in these objects is a vector of non-negative weights of vertices of the corresponding hull. Advantageously, such a representation allows separating the weights of these vectors from the state of the object. Specifically, the position of the object represented by the convex hull depends on the state, but the weights themselves defining different points in the hull are independent of the states. Such a representation makes the formulation of the distance between the points of the object and the points of the obstacle a convex problem where the weights are required to lie on a simplex. The simplex is a convex set whose elements, the weights, are nonnegative and sum to one. The convexity of the minimum distance optimization allows reformulating using first-order stationary conditions subject to the complementarity constraints.

In such a manner, some embodiments transform the nested optimization problem of the NLP 110 into a single optimization problem 115 subject to constraints on a solution of first-order stationary conditions modeling a minimum distance between a convex hull of the object and a convex hull of the obstacle using complementarity constraints. Representing the constraint on a minimum distance as a solution of first-order stationary conditions makes such a representation differentiable, but may require formulating a solution of the optimization problem 115 as a Mathematical Program with Complementarity Constraints (MPCC).

In other words, the NLP with complementarity constraints is the MPCC. A complementarity constraint is a mathematical relation between functions $g(x) \geq 0$, $h(x) \geq 0$ mapping to the set of scalars that requires that either $g(x)=0$ or $h(x)=0$. This is compactly represented as $g(x) \geq 0 \perp h(x) \geq 0$. If the functions $g(x)$, $h(x)$ are vector functions of equal dimensions then the notation $g(x) \geq 0 \perp h(x) \geq 0$ is understood to hold for each of the i-th components $g_i(x) \geq 0 \perp h_i(x) \geq 0$.

FIG. 2A shows a block diagram of a method 200 for controlling a motion of an object performing a task changing the state of the object from a start state to an end state while avoiding collision of the object with an obstacle according to some embodiments. The method is executed by a controller that uses a processor coupled with stored instructions implementing the method, wherein the instructions, when executed by the processor, carry out steps of the method.

The method includes obtaining 201 data indicative of the dynamics and geometry of the object and the obstacle. The data 201 can be received via wired or wireless communication available in the art. For example, the dynamics of the object can include includes a set of equations that describe a change of the state of the object in response to applying one or more forces of an actuator of the object. These dynamics allow to plan the motion of the object actuated by the actuator, such as motor or a manipulator of a robotic arm.

In various embodiments, the obstacle can be static or moving. The dynamic of the static obstacle indicates the fixed pose of the obstacle. The dynamic of the static obstacle indicates a trajectory of the obstacle defining a state of the obstacle as a function of time. In such a manner, the dynamics of the obstacle can be considered by the optimization solver in planning the optimal trajectory of the object.

The geometry of the object and the obstacle indicate the convex hulls of the object and the obstacle. The convex hull can be received as part of the geometry or calculated based on the geometry. In some embodiments, the geometry includes three-dimensional (3D) information. An example of a shape of the convex hull includes a polytope. Having the representation of the geometry of the object and the obstacle as convex hulls allows defining the points within the convex hulls as weighted combinations of vertices of the convex hull of the object and vertices of the convex hull of the obstacle. Such a representation allows imposing the complementarity constraints on the weights for the vertices of the convex hulls of the object and the obstacle thereby enforcing the minimum distance in a manner decoupled from the states of the object and the obstacle.

Next, the method solves 202 an optimization problem of the dynamics of the object producing an optimal trajectory for performing the task subject to constraints on a solution of first-order stationary conditions modeling a minimum distance between the convex hull of the object and the convex hull of the obstacle using complementarity constraints. In some implementations, because the weights governed by the complementarity constraints are independent of the state of the object and the state of the obstacle, wherein the optimization problem models the minimum distance by changing locations of the vertices of the convex hulls of the object and the obstacle in accordance with their corresponding states.

In different embodiments, the solution of the optimization problem optimizes an objective function defining one or more of a minimum time problem, object manipulation problem, or a mathematical structure of the objective function. In these embodiments, the NLP solver 110 is transformed into the MPCC 115 due to complementarity constraints to avoid the nested optimization problem.

Next, the method controls 203 the motion of the object according to the optimal trajectory. For example, to control the motion of the object, the controller is configured to generate control commands directing an actuator to move the object to follow the optimal trajectory. Additionally, the controller can be further configured to cause the actuator to generate optimal trajectory forces.

The transformation of the nested optimization problem into a single optimization problem requires fewer iterations which in turn consumes fewer resources in comparison to what would have been consumed by the nested problem. Thus, some example embodiments lead to a faster optimization process for which some beneficial aspects realized include significant improvement in overall resource consumption, CPU time, and clock cycles when executing the process. Such technical benefits are further magnified and get transformed into more practical benefits when the optimization problem is implemented as a part of a resource-scarce application such as autonomous driving, robots, drones, and the like.

Figure 2B:
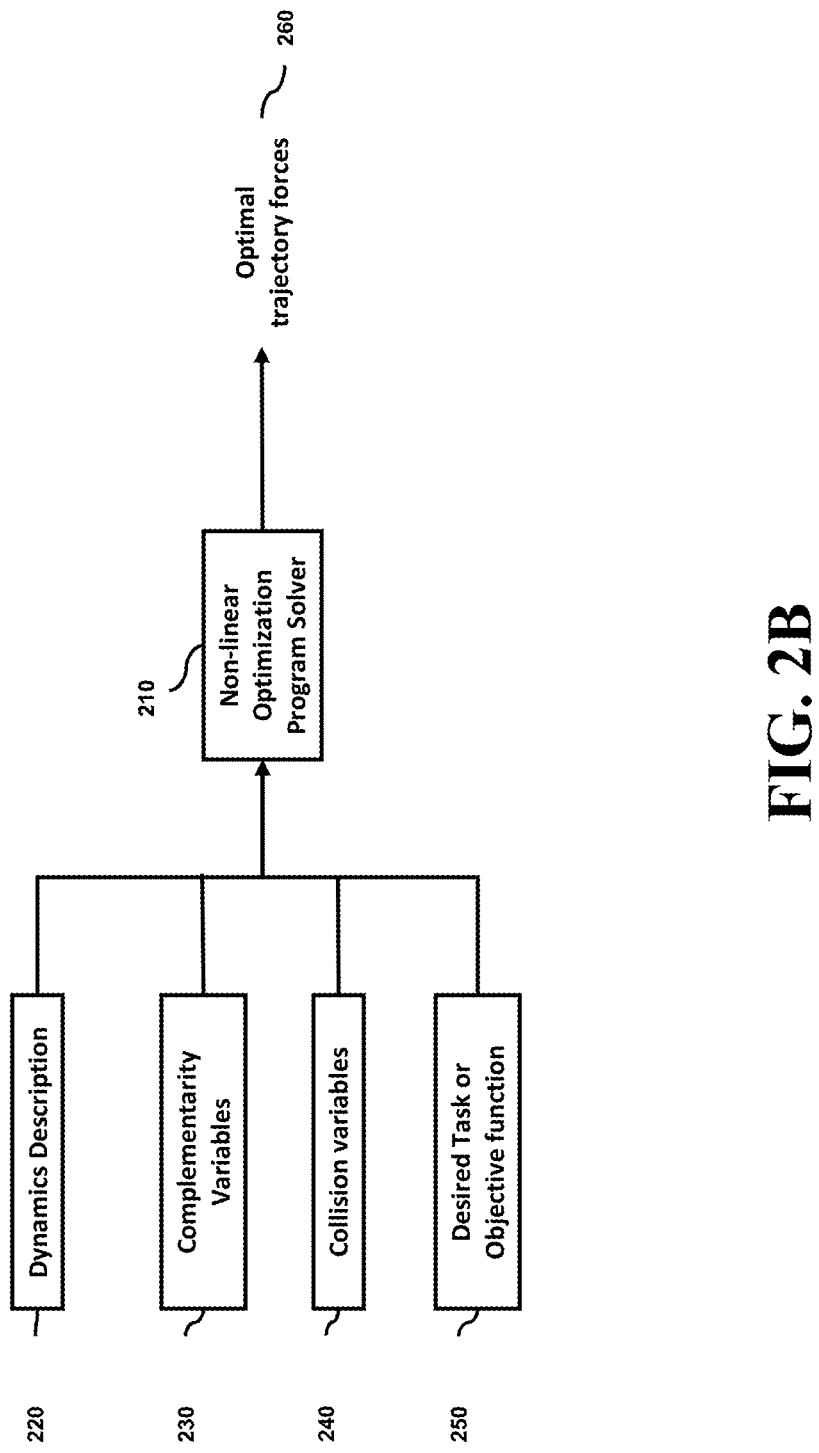
FIG. 2B illustrates a sequential workflow of an optimization solver for solving an optimization according to one embodiment.

FIG. 2B illustrates a sequential workflow of an optimization solver for solving an optimization 202 according to one embodiment. In this embodiment, controller 50 solves the trajectory optimization problem using NLP solvers, such as the NLP solver 210, even when the objects and obstacles are modeled as polytopes. The controller 50 may be a part of a machine that performs a task on or using the object. For example, controller 50 may be resident to a robot performing robotic manipulation on the object. Alternately, the controller 50 may be resident to a vehicle performing automated parking or to a UAV performing automated surveillance, delivery, etc. In each such example application, controller 50 performs control on the object, for example in some cases the control may be contact-based manipulation as in the case of a robotic manipulator, or a non-contact-based control of the motion of the object such as in the case of a vehicle. Thus, the control of the object may be considered to be directed towards performing the desired task. Each such task may have associated with it, one or more objective functions.

The NLP solver 210 may reside in a memory associated with controller 50 and may be invoked on-demand by controller 50. In this regard, FIG. 2 illustrates a sequential workflow of the NLP solver of the controller 50.

The NLP solver 210 takes as inputs (amongst several things), dynamics description 220 of the object, complementarity variables 230, collision variables 240, and a definition of the desired task or objective function 250. Dynamics description 220 may define a set of equations that describe how the object moves when subjected to one or more forces. That is, the description of the dynamics may define the dynamic behavior of the object. Controller 50 may receive the description of the dynamics from users via an interface. Alternately, controller 50 may obtain the description of the dynamics from a database storing such information.

Objective functions 250 define goal of the end user associated with the task. For example, the objective function may define a minimum time problem associated with the task, a destination location for the object, or in some cases additionally the structure of the objective function (quadratic or non-linear). The output provided by the non-linear optimization program solver is the optimal trajectory, i.e., the sequence of states of the objects and the control inputs that may include forces or torques 260 to be exerted or applied to the object to be manipulated. The controller 50 can thus control the object (in this case motion of the object) using the generated values of the optimal trajectory forces 260 while avoiding collision with the obstacles 104, 105.

Figure 3A:
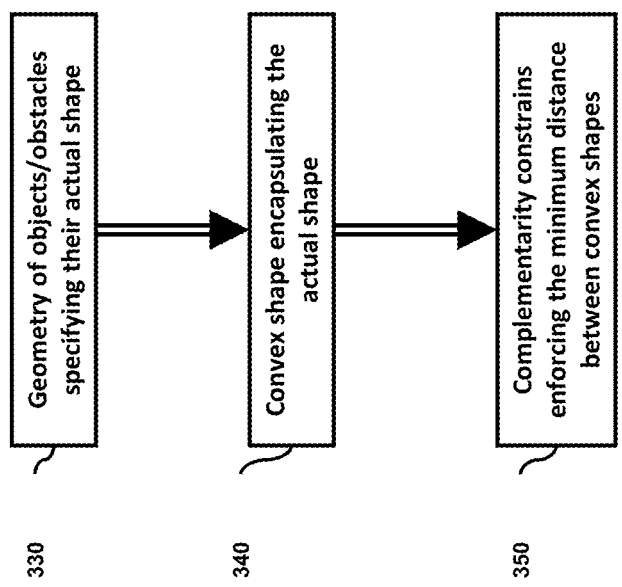
FIG. 3A shows a schematic of principles for imposing complementarity constraints on the minimum distance between the object and the obstacle according to some embodiments.

FIG. 3A shows a schematic of principles for imposing complementarity constraints on the minimum distance between the object and the obstacle according to some embodiments. Some embodiments are based on the recognition that the geometry 330 defining the actual shape of the object and/or the obstacle may or may not be convex. When the shape is convex, the resulting optimization problem may not be convex as well, and solving the non-convex optimization is challenging.

To that end, some embodiments enclose 340 the actual shape of the object and the obstacle in the convex shape and define the complementarity constraints 350 enforcing the minimum distance with respect to those convex shapes and not necessarily the actual shape of the object and the obstacle. In such a manner, the resulting optimization problem solved by some embodiments subject to complementarity constraints is convex.

Figure 3B:
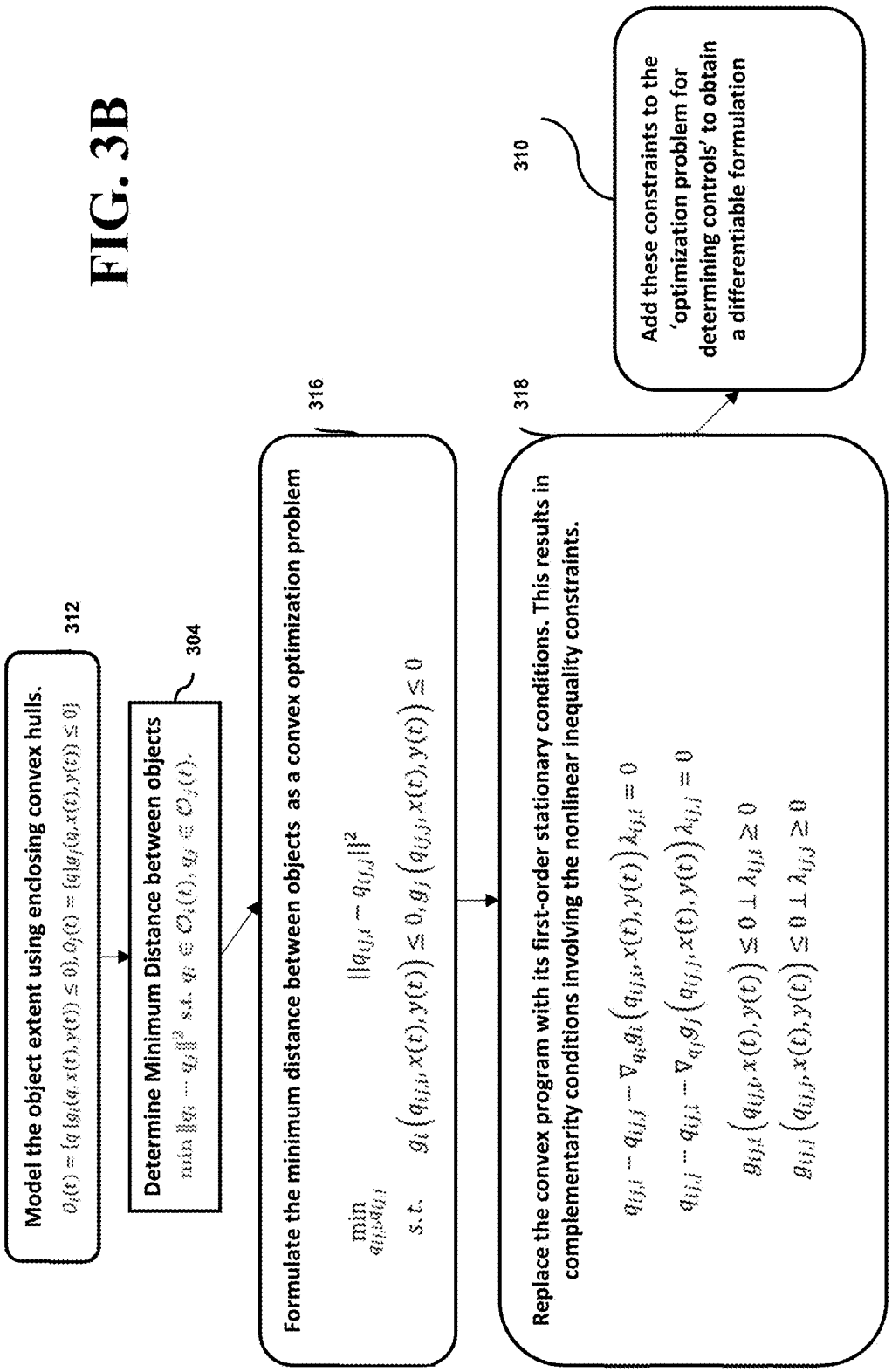
FIGS. 3B and 3C show schematics of principles for performing control of the object using principles of FIG. 3A according to some embodiments.
Figure 3C:
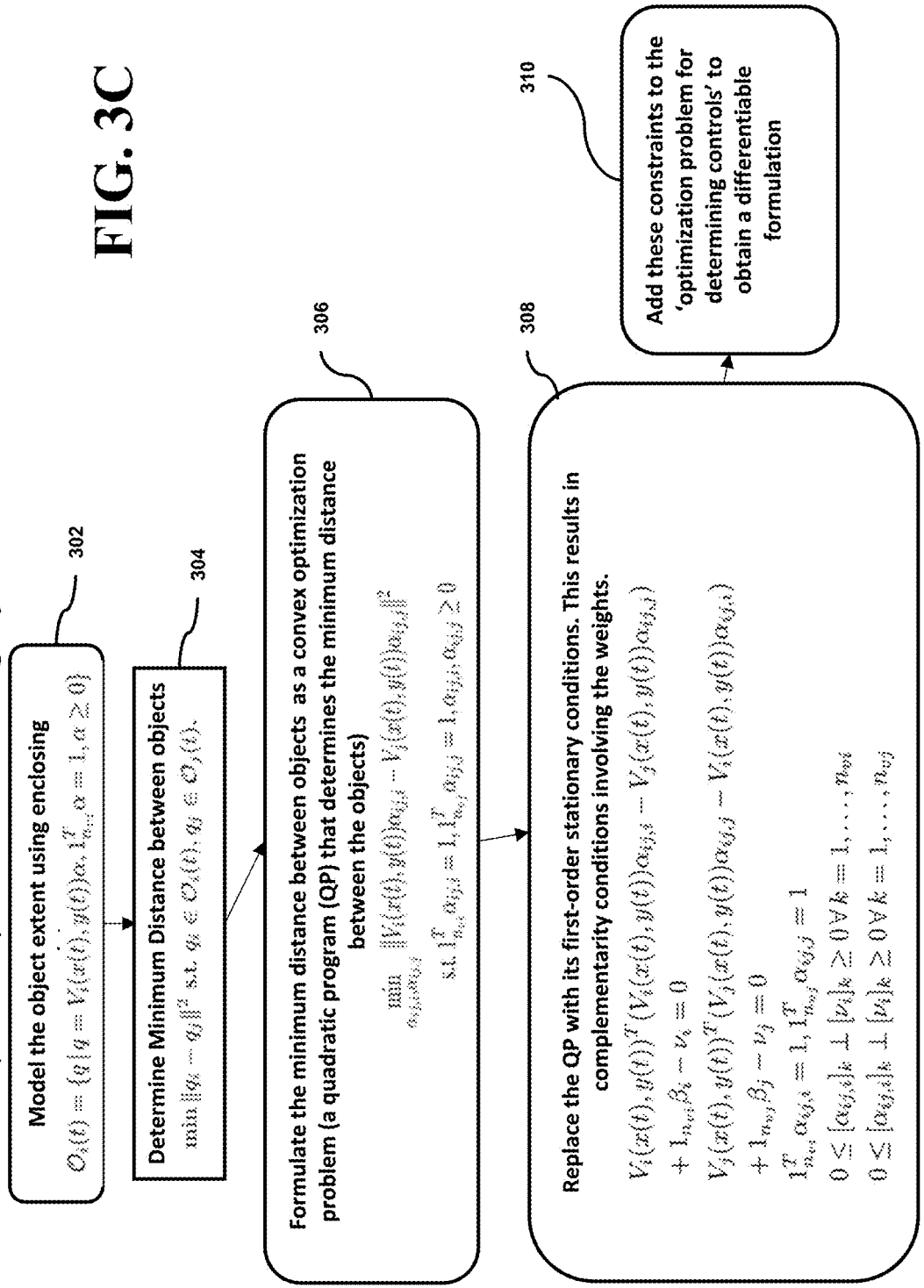

FIGS. 3B and 3C show schematics of principles for performing control of the object using principles of FIG. 3A according to some embodiments. For example, in the embodiment of FIG. 3B, each of the convex shapes of the object and the obstacle is a convex hull defined by a set of inequalities defining points within the convex hull of the object and a set of inequalities defining points within the convex hull of the obstacle, and wherein the complementarity constraints are imposed on the sets of inequalities of the object and the obstacle to enforcing the minimum distance between the object and the obstacle.

In this embodiment, the convex hull of the objects are represented 312 by a set of convex nonlinear inequalities $O_i=\{q|g_i(q,x(t),y(t))\leq 0\}$, $O_j(t)=\{q|g_j(q,x(t),y(t))\leq 0\}$, where $g_i$ represents a set of $n_{gi}$ inequalities and $n_{gj}$ inequalities. Such a representation has the advantage of providing a tighter representation of the convex hull of the object. The method of converting the optimization problem in Eq (1) by the first-order stationary conditions can also be applied in this technique since the nonlinear constraints $g_i,g_j$ are convex.

For example, the minimization problem of (1) can be equivalently posed 316 as:

$$\min_{q_{ij,i},q_{ij,j}} \|q_{ij,i} - q_{ij,j}\|^2 \tag{6}$$

$$\text{s.t. } g_i(q_{ij,i}, x(t), y(t)) \leq 0, \ g_j(q_{ij,j}, x(t), y(t)) \leq 0$$

At an optimal solution $q^*_{ij,i}$ and $q^*_{ij,j}$ to (6), are respectively the points in objects i; j that give the shortest distance between the objects. The optimization problem in (6) is a convex problem. Every first-order stationary point of (6) is a minimizer.

Using the convexity of the constraint defining the convex bodies the optimization formulation in (6) can be posed using its first-order stationary conditions. Accordingly, at 318, controller 50 imposes (6) through its first-order stationary conditions by replacing the convex program with its first-order stationary conditions. This results in complementarity conditions 318. For example, imposing (6) through its first order stationary conditions gives:

1. $q_{ij,i} - q_{ij,j} - \nabla_{q_i} g_i(q_{ij,i}, x(t), y(t))\lambda_{ij,i} = 0$ \hfill (7a)

2. $q_{ij,j} - q_{ij,i} - \nabla_{q_j} g_j(q_{ij,j}, x(t), y(t))\lambda_{ij,j} = 0$ \hfill (7b)

3. $g_{ij,i}(q_{ij,i}, x(t), y(t)) \leq 0 \perp \lambda_{ij,i} \geq 0$ \hfill (7c)

4. $g_{ij,j}(q_{ij,j}, x(t), y(t)) \leq 0 \perp \lambda_{ij,j} \geq 0$ \hfill (7d)

where $\lambda_{ij,i}$, $\lambda_{ij,j}$ are the multipliers for the inequality constraints in (6).

The above formulation of the corresponding optimization problem takes into consideration the dynamics of the object and such a formulation results in a mathematical program with complementarity constraints (MPCC). Such a formulation makes the optimization problem smooth, which would otherwise have been non-differentiable. The separation requirement can be modeled as:

$$\sqrt{\|q_{ij,i} - q_{ij,j}\|^2 + \epsilon^2} \geq \sqrt{\epsilon_{ij}^2 + \epsilon^2} \tag{8}$$

The parameter $\epsilon > 0$ is a small constant that is included to render the constraint (8) differentiable everywhere. The separation requirements between the $n_O$ objects are modeled through the constraints (7a-7d) and (8) for all i<j; and i; j ∈ $\{1, \ldots n_O\}$.

FIG. 3C shows a schematic of principles for performing control of the object employed by the controller 50 according to another embodiment. In this embodiment, each of the convex shapes of the object and the obstacle is a polytope defined by a set of vertices, wherein points within the polytope of the object are defined as weighted combinations of the vertices of the polytope of the object, wherein points within the polytope of the obstacle are defined as weighted combinations of the vertices of the polytope of the obstacle, and wherein the complementarity constraints are imposed on the weights for the vertices of the polytopes of the object and the obstacle to enforcing the minimum distance between the object and the obstacle. This is advantageous because finding a convex polytope for arbitrary objects is a computationally efficient task.

At 302, the controller 50 models the object extent of each object in the space of interest using enclosing polytopes. In this regard, controller 50 may employ any suitable imaging and associated image processing technique to define the polytope as a bounding polyhedron. That is, controller 50 is communicably coupled to one or more suitable apparatuses (such as imaging apparatuses) that provide such realization of an enclosing polytope for each entity in the space of interest. Each entity in the space of interest may be modeled using a separate enclosing polytope.

Figure 4:
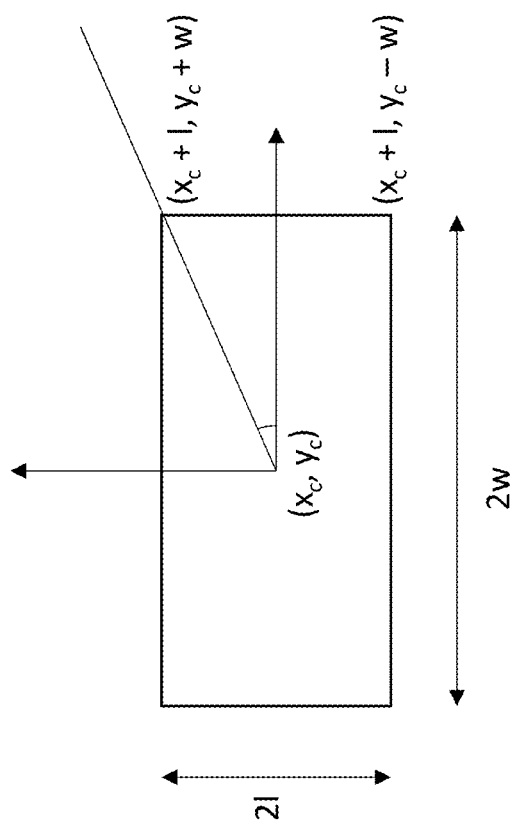
FIG. 4 illustrates one example of parameterizing objects and obstacles using polytopes.

FIG. 4 illustrates one example of parameterizing objects and obstacles using polytopes. Every point inside an object or obstacle can be expressed in terms of the vertices of the polytope enclosing the object or the obstacle. For the sake of this illustration, an object and obstacle are treatable alike and therefore the explanation for the object is equally applicable to obstacles as well. Considering a rectangular object having a first dimension along the x-axis as 2l and a second dimension along the y-axis as 2w, the center is assumed to have coordinates $(x_c, y_c)$ in the xy plane. In such a case, the vertices of the object will have the coordinates $(x_c+l, y_c+w)$, $(x_c-l, y_c+w)$, $(x_c-l, y_c-w)$, and $(x_c+l, y_c-w)$ in the four quadrants of the xy plane respectively. Thus, the points inside the object can be expressed in terms of the vertices of the enclosing polytope and the object can be modeled as a continuous mass body rather than approximating as a point mass.

The above description discussed the modeling of objects and obstacles in two dimensions. However, example embodiments disclosed herein are also based on the realization that the extent of the objects and obstacles are modeled as polytopes in three dimensions (3D) and are specified by the set of vertices of the polytope. Let $n_O$ denote the number of objects. The polytope bounding the objects at time t are denoted by $O_i(t)$ for $i=1, \ldots, n_O$. The controller 50 obtains, for example from a user, the matrix $V_i(x(t), y(t)) \in R^{3 \times nvi}$ with columns representing the coordinates of the nvi vertices of the polytope $O_i(t)$. The polytope $O_i(t)$ is $$O_i(t) = \{q | q = V_i(x(t), y(t))\alpha, 1^T_{nvi}\alpha = 1, \alpha \geq 0\}$$

where $1_{nvi} \in R_{nvi}$ is a vector of all ones and $\alpha \in R^{nvi}$ are nonnegative vectors that generate the convex hull of the vertices. The dependence of the coordinates' vertices on the position, the orientation of the object is modeled through the functional dependence of $V_i$ on $x(t), y(t)$. Note that a static obstacle's vertex coordinates are independent of $x(t), y(t)$. Therein lies the difference between the treatment of objects and static obstacles.

Figure 5B:
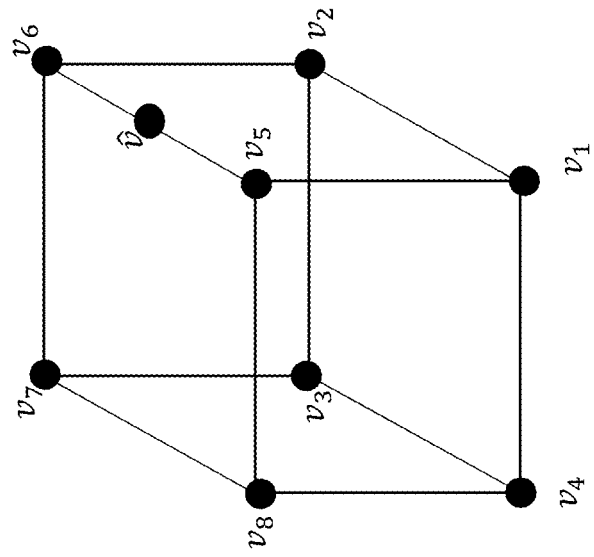
FIGS. 5A, 5B, 5C, and 5D illustrate some examples of parameterization of any point of the object in terms of vertices of the polytope according to some embodiments.
Figure 5A:
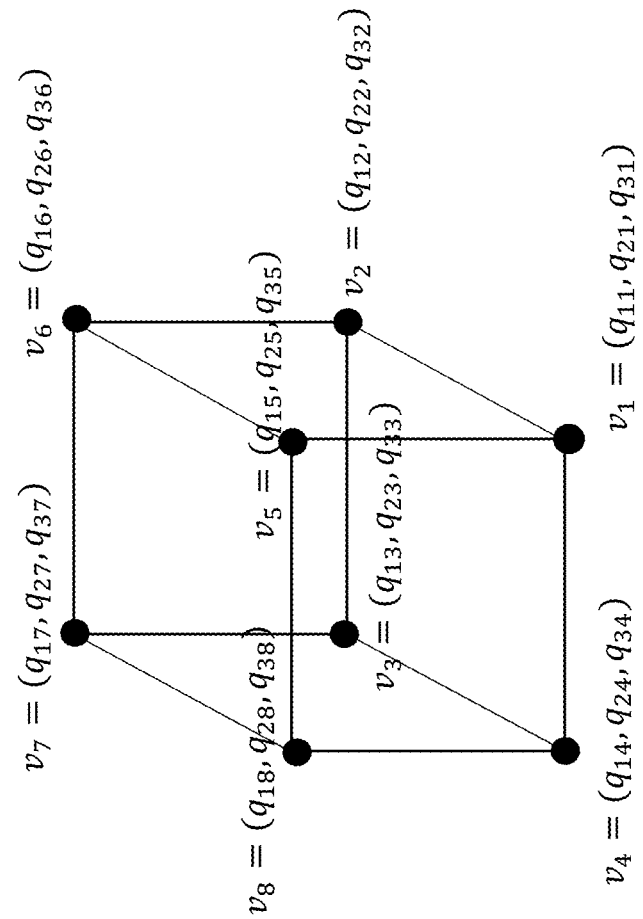

FIGS. 5A, 5B, 5C, and 5D illustrate some examples of parameterization of any point of the object in terms of vertices of the polytope according to some embodiments. With particular reference to FIG. 5A, matrix V represents the vertices of a cuboid-shaped polytope enclosing an object where $q_{ab}$ corresponds to the coordinates of the vertex $v_b$ in plane a. In terms of the coordinates of each vertex, matrix V is represented as:

$$V = [v_1 \; v_2 \; v_3 \; v_4 \; v_5 \; v_6 \; v_7 \; v_8]$$
$$= \begin{bmatrix} q_{11} & q_{12} & q_{13} & q_{14} & q_{15} & q_{16} & q_{17} & q_{18} \\ q_{21} & q_{22} & q_{23} & q_{24} & q_{25} & q_{26} & q_{27} & q_{28} \\ q_{31} & q_{32} & q_{33} & q_{34} & q_{35} & q_{36} & q_{37} & q_{38} \end{bmatrix}$$

As shown in FIG. 5B, a point $\hat{v}$ lying on an edge of the cuboid (between two vertices) can be represented as:

$$\hat{v} = \alpha_5 v_5 + \alpha_6 v_6$$

where $\alpha_5, \alpha_6 \geq 0$, $\alpha_5 + \alpha_6 = 1$

In terms of the matrix V, point $\hat{v}$ also be written as:

$$\hat{v} = V \begin{bmatrix} 0 \\ 0 \\ 0 \\ 0 \\ \alpha_5 \\ \alpha_6 \\ 0 \\ 0 \end{bmatrix}$$

where $\alpha_5, \alpha_6 \geq 0$, $\alpha_5 + \alpha_6 = 1$

Figure 5D:
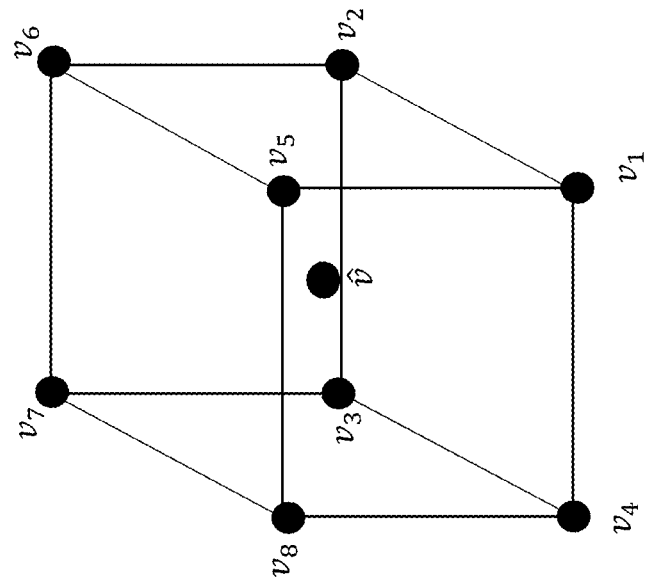
Figure 5C:
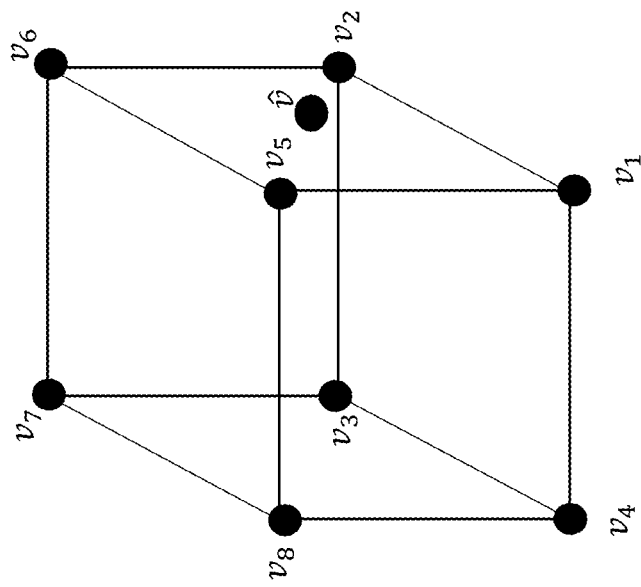

When point $\hat{v}$ lies on a face of the cuboid shaped polytope, the above parameterization can be extended by considering all the vertices of the face. In the example shown in FIG. 5C, since point $\hat{v}$ lies on a face defined by vertices $v_1, v_2, v_5$, and $v_6$, point v can be expressed as:

$$\hat{v} = \alpha_1 v_1 + \alpha_2 v_2 + \alpha_5 v_5 + \alpha_6 v_6$$

where $\alpha_1, \alpha_2, \alpha_5, \alpha_6 \geq 0$, $\alpha_1, \alpha_2, \alpha_5 + \alpha_6 = 1$ Rewritting, point $\hat{v}$ in terms of the matrix V, point v is represented as:

$$\hat{v} = V \begin{bmatrix} \alpha_1 \\ \alpha_2 \\ 0 \\ 0 \\ \alpha_5 \\ \alpha_6 \\ 0 \\ 0 \end{bmatrix}$$

where $\alpha_1, \alpha_2, \alpha_5, \alpha_6 \geq 0$, $\alpha_1, \alpha_2, \alpha_5 + \alpha_6 = 1$ Finally, when point $\hat{v}$ lies inside the polytope, as is the case represented in FIG. 5D, the expression for point v in terms of the vertices of the polytope becomes:

$$\hat{v} = \sum_{i=1}^{8} \alpha_i v_i$$

where $\alpha_i \geq 0$, $\Sigma_{i=1}^{8} \alpha_i = 1$

Rewritting, point $\hat{v}$ in terms of the matrix V, point $\hat{v}$ is represented as:

$$\hat{v} = V \begin{bmatrix} \alpha_1 \\ \alpha_2 \\ \alpha\_3 \\ \alpha\_4 \\ \alpha_5 \\ \alpha_6 \\ \alpha_7 \\ \alpha_8 \end{bmatrix}$$

where $\alpha_i \geq 0$, $\Sigma_{i=1}^{8} \alpha_i = 1$

Thus, in this manner, all points inside the polytope can be parameterized as a convex combination of the vertices of the polytope enclosing the object.

The collision avoidance between a pair of objects $O_i(t)$ and $O_j(t)$ requires that the shortest distance between the two objects is greater than a tolerance E. Referring back to FIG. 3, at 304, controller 50 determines the minimum distance between objects in the space of interest. Considering two objects i, j ∈ {1, . . . , $n_O$}, the distance between the objects at time t is:

$$\min \|q_i - q_j\|^2 \text{ such that. } q_i \in O_i(t), q_j \in O_j(t). \quad (1)$$

If the minimum separation required between the two objects is $\epsilon_{ij} > 0$, the distance constraint is modeled as:

$$\|q_i - q_j\| \geq \epsilon_{ij} \quad (2)$$

where $q_i$ and $q_j$ satisfy the minimum distance condition (1) above.

The above formulation is at best once differentiable when the minimizer of (1) is unique. However, the uniqueness requirement cannot be ensured when the objects are modeled as polytopes, as above. As a consequence, the formulation in (2) cannot be directly provided to NLP solvers.

In order to solve the formulation by NLP solvers, controller 50 transforms the inner optimization problem into a convex/quadratic program. Towards this end, at 306, controller 50 formulates the minimum distance between objects as a convex optimization problem (a quadratic program (QP) that determines the minimum distance between the objects). For example, the minimization problem of (1) can be equivalently posed as:

$$\min_{\alpha_{ij;i}, \alpha_{ij,j}} \|V_i(x(t), y(t))\alpha_{ij,i} - V_j(x(t), y(t))\alpha_{ij,j}\|^2 \quad (3)$$

$$\text{s.t. } 1^T_{n_{vi}} \alpha_{ij,i} = 1, 1^T_{n_{nj}} \alpha_{ij,j} = 1, \alpha_{ij,i}, \alpha_{ij,j} \geq 0$$

where $\alpha_{ij;i}$ and $\alpha_{ij;j}$ are variables denoting the convex combinations of the vertices of the polytope bounding the objects i, j. At an optimal solution $\alpha^*_{ij;i}$ and $\alpha^*_{ij;j}$ to (3), the points $V_i(x(t), y(t))\alpha^*_{ij;i}$ and $V_j(x(t), y(t))\alpha^*_{ij;j}$ are respectively the points in objects i; j that give the shortest distance between the objects. The optimization problem in (3) is a convex problem. Every first-order stationary point of (3) is a minimizer.

Using the convexity of the constraint defining the convex bodies the optimization formulation in (3) can be posed using its first-order stationary conditions. Accordingly. at 308, controller 50 imposes (3) through its first-order stationary conditions by replacing the QP with its first-order stationary conditions. This results in complementarity conditions involving the weights. For example, imposing (3) through its first order stationary conditions gives:

$$V_i(x(t),y(t))^T(V_i(x(t),y(t)\alpha_{ij,i} - V_j(t),y(t))\alpha_{ij,j}) + 1_{n_{vi}}\beta_i - v_i = 0 \quad (4a)$$

$$V_j(x(t),y(t))^T(V_j(x(t),y(t)\alpha_{ij,j} - V_i(t),y(t))\alpha_{ij,i}) + 1_{n_{vj}}\beta_j - v_j = 0 \quad (4b)$$

$$1_{n_{vi}}^T \alpha_{ij,i} = 1, 1_{n_{vj}}^T \alpha_{ij,j} = 1 \quad (4c)$$

$$0 \leq [\alpha_{ij,i}]_k \perp [v_i]_k \geq 0 \forall k = 1, \ldots, n_{vi} \quad (4d)$$

$$0 \leq [\alpha_{ij,j}]_k \perp [v_i]_k \geq 0 \forall k = 1, \ldots, n_{vj} \quad (4e)$$

where $\beta_i$, $\beta_j$ t are the multipliers for the equality constraints in (4c) and $v_i$; $v_j$ are the multipliers for the nonnegative bounds on $\alpha_{ij;i}$; $\alpha_{ij;j}$.

The above formulation of the corresponding optimization problem takes into consideration the dynamics of the object and such a formulation results in a mathematical program with complementarity constraints (MPCC). Such a formulation makes the optimization problem smooth, which would otherwise have been non-differentiable. The separation requirement can be modeled as:

$$\sqrt{\|V_i(x(t), y(t))\alpha_{ij,i} - V_j(x(t), y(t))\alpha_{ij,j}\|^2 + \epsilon^2} \geq \sqrt{\epsilon_{ij}^2 + \epsilon^2} \quad (5)$$

The parameter $\epsilon > 0$ is a small constant that is included to render the constraint (5) differentiable everywhere. The separation requirements between the $n_O$ objects are modeled through the constraints (4a-4e) and (5) for all i<j; and i; j ∈ {1, . . . $n_O$}.

At 310, the controller utilizes the constraints defined in (4a)-(4e) and adds these constraints to the 'optimization problem for determining controls' to obtain a differentiable formulation. The smooth problem can be fed to NLP solvers stored in the memory associated with the controller 50 and values of trajectory forces required for manipulating the object can thus be determined. In this way, example embodiments provide advantages in terms of processing speed by reducing the complexity of the problem. The time taken to compute the values of forces is considerably reduced due to smoothening of the collision avoidance problem. Suh reduction in the computational time has far-reaching effects on the overall process for controlling the object. Thus, example embodiments result in significant improvements in the automation device such as robotic manipulator).

Figure 6:
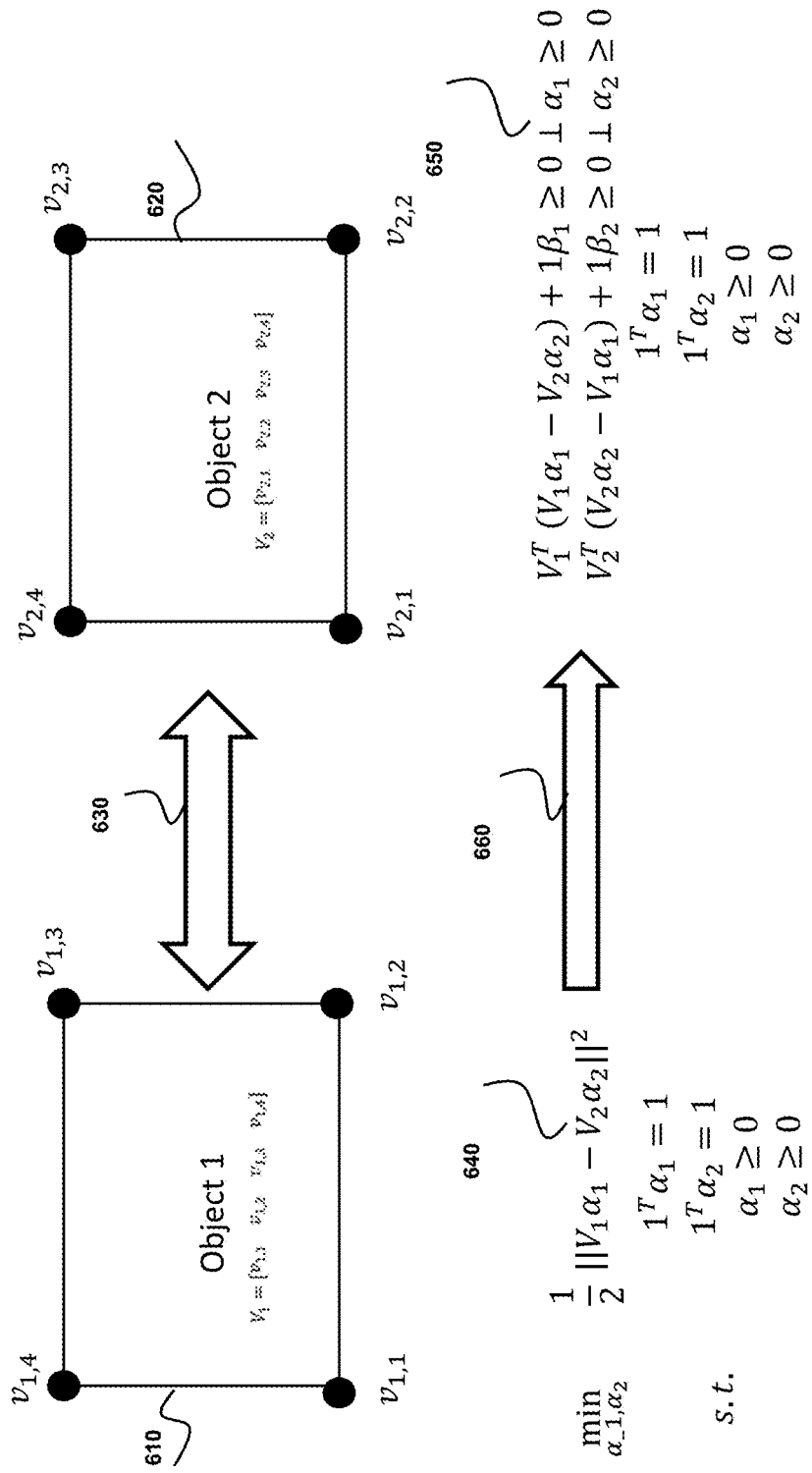
FIG. 6 is an illustration of the transformation of the nested optimization problem into a convex/quadratic program and identifying first-order optimality conditions subject to the complementarity constraints.

FIG. 6 is an illustration of the transformation of the nested optimization problem into a convex/quadratic program and identifying first-order optimality conditions subject to the complementarity constraints. In this example, the distance 630 between the objects 610 and 620 is transformed 660 from the inner optimization 640 into complementarity constraints 650. In such a manner, the nested optimization problem is avoided.

The transformation of the nested optimization problem into a single optimization problem requires fewer iterations which in turn consumes fewer resources in comparison to what would have been consumed by the nested problem. Thus, some example embodiments lead to a faster optimization process for which some beneficial aspects realized include significant improvement in overall resource consumption, CPU time, and clock cycles when executing the process. Such technical benefits are further magnified and get transformed into more practical benefits when the optimization problem is implemented as a part of a resource-scarce application such as autonomous driving, robots, drones, and the like.

Furthermore, some example embodiments lead to a better optimized trajectory in terms of accuracy because the underlying transformation of the problem does not have to assume or approximate much owing to the smoothness induced into the constraints. This is because expressing the constraints as complementarity conditions allows us to use tailored relaxations that allow to robustly solve using conventional optimization algorithms and thus, lead to higher quality solutions.

Some embodiments are based on the understanding that control optimization avoiding the collision can be useful for many control applications, such as robots performing assembly, parking or controlling an autonomous car, autonomous motion of drones. Particularly, some embodiments are based on the realization that formulating collision avoidance problems with complementarity constraints can be especially beneficial in robotic applications. Most robotic applications are characterized by the presence of constrained environments while dealing with challenging underlying phenomena like unilateral contacts, frictional contacts, impact, and deformation resulting in contact-rich multi-body interactions. These contact-rich, multi-body frictional interaction systems are generally described by non-smooth dynamics which can be expressed using complementarity conditions. Hence, when collision avoidance is also formulated by complementarity constraints, such a formulation allows to handle contact and collision avoidance in a unified manner.

Figure 7A:
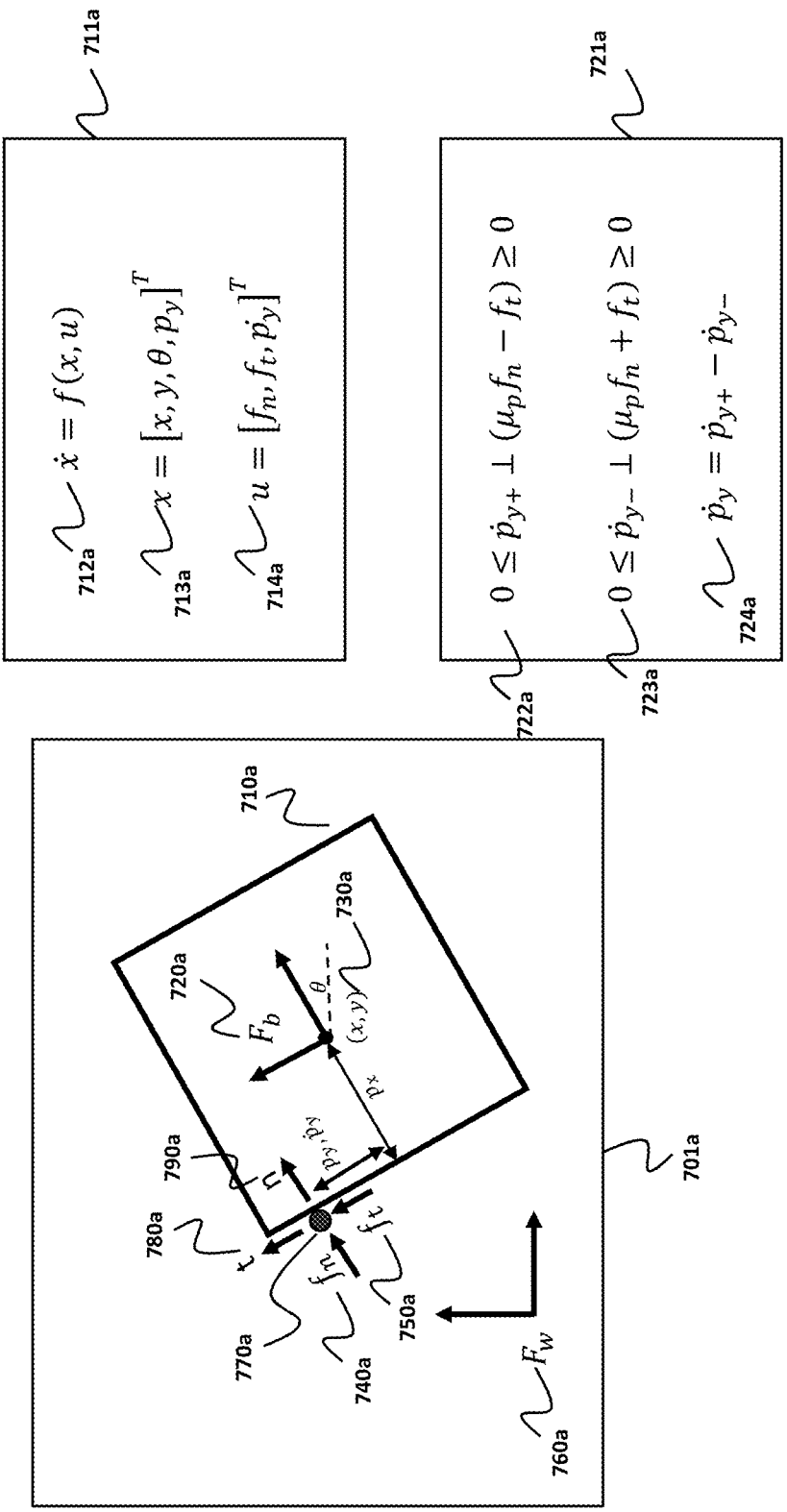
FIG. 7A shows a schematic of an example scenario for a robotic manipulation according to some embodiments.

FIG. 7A shows a schematic of an example scenario for a robotic manipulation according to some embodiments. This figure shows a schematic for a pusher-slider system 701a. The pusher 770a could be a robotic end-effector or a tool attached to a robotic end-effector. The pusher interacts with the slider 710a by exerting forces $f_n$, 740a and $f_t$ 750a along the normal 790a and tangential 780a axis of the contact surface between the pusher and the slider. The state (x, y, θ) 730a of the slider 710a is measured in the global frame of reference $F_w$ 760a. The position of the pusher 770a is measured in the frame of reference of the slider $F_b$ 720a. The dynamics model of the pusher-slider system is shown as a schematic diagram 711a. The dynamics equations are represented as differential equations 712a as $\dot{x}=f(x, u)$ where x 713a represents the state of the system given as x=[x, y, θ, $p_y$]$^T$ and the control input u 714a is given by u=[$f_n$, $f_t$, $\dot{p}_y$]$^T$. The complementarity conditions 721a arise due to the nature of Coulomb friction. According to the Coulomb friction law, the slider and the pusher stay in sticking contact mode, i.e., $\dot{p}_y$=0 as long as |$f_t$|≤$\mu_p f_n$, where $\mu_p$ is the coefficient of friction between the slider and the pusher. The pusher can maintain a sliding contact with the slider only when $f_t$=±$\mu_p f_n$. These conditions can be expressed as complementarity conditions 721a between the complementary variables $\dot{p}_y$, $f_n$, $f_t$ as given by 722a, 723a, and 724a.

Complementarity variables 230 may define parameters that help describe the dynamics of the object that may arise due to phenomena like contacts or any other discontinuities. The relationship between these variables are complementarity constraints. These complementarity constraints need to be provided to the controller by a user using a programmed interface. Collision variables 240 are the vertices of the obstacle(s) that may be present in the environment of the object. These are provided to the user through some sensors like cameras or lidars which can map the environment of the object.

Figure 7B:
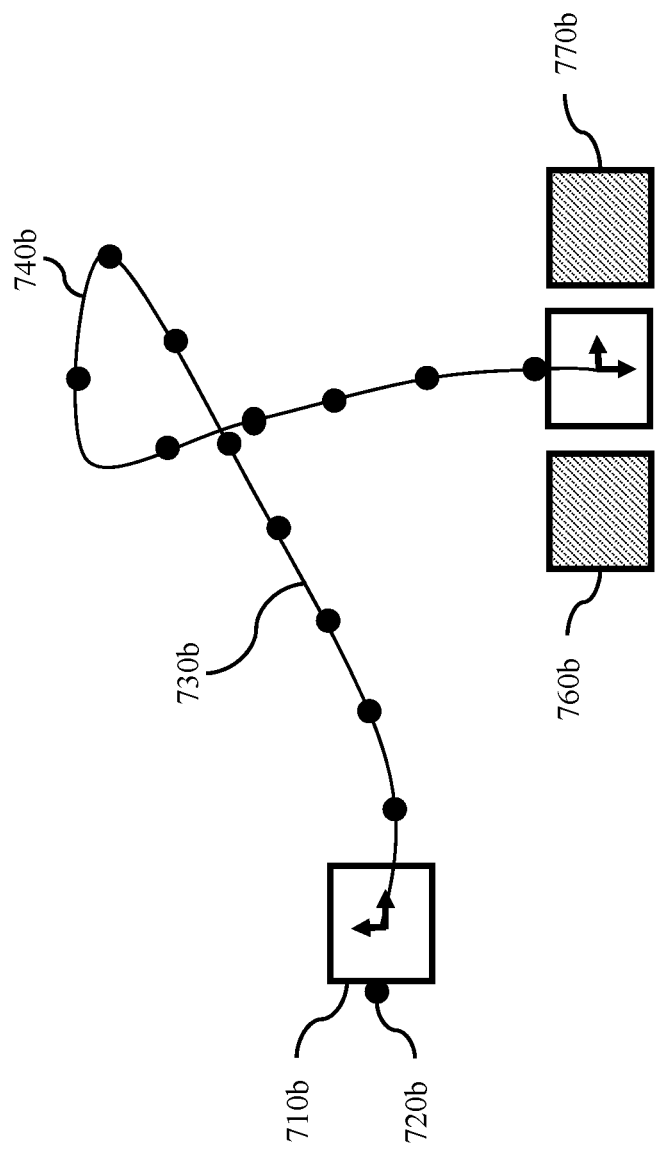
FIG. 7B shows an example scenario of the slider-pusher system in the presence of obstacles and according to some embodiments.

FIG. 7B shows an example scenario of the slider-pusher system in the presence of obstacles 760b and 770b according to some embodiments. The schematic shows a possible optimal trajectory 740b which comprises of a sequence of states 730b for the pusher 720b. Apart from the trajectory 740b, the optimizer finds also an optimal sequence of control forces and pusher velocity on the surface of the slider 710b.

Figure 7C:
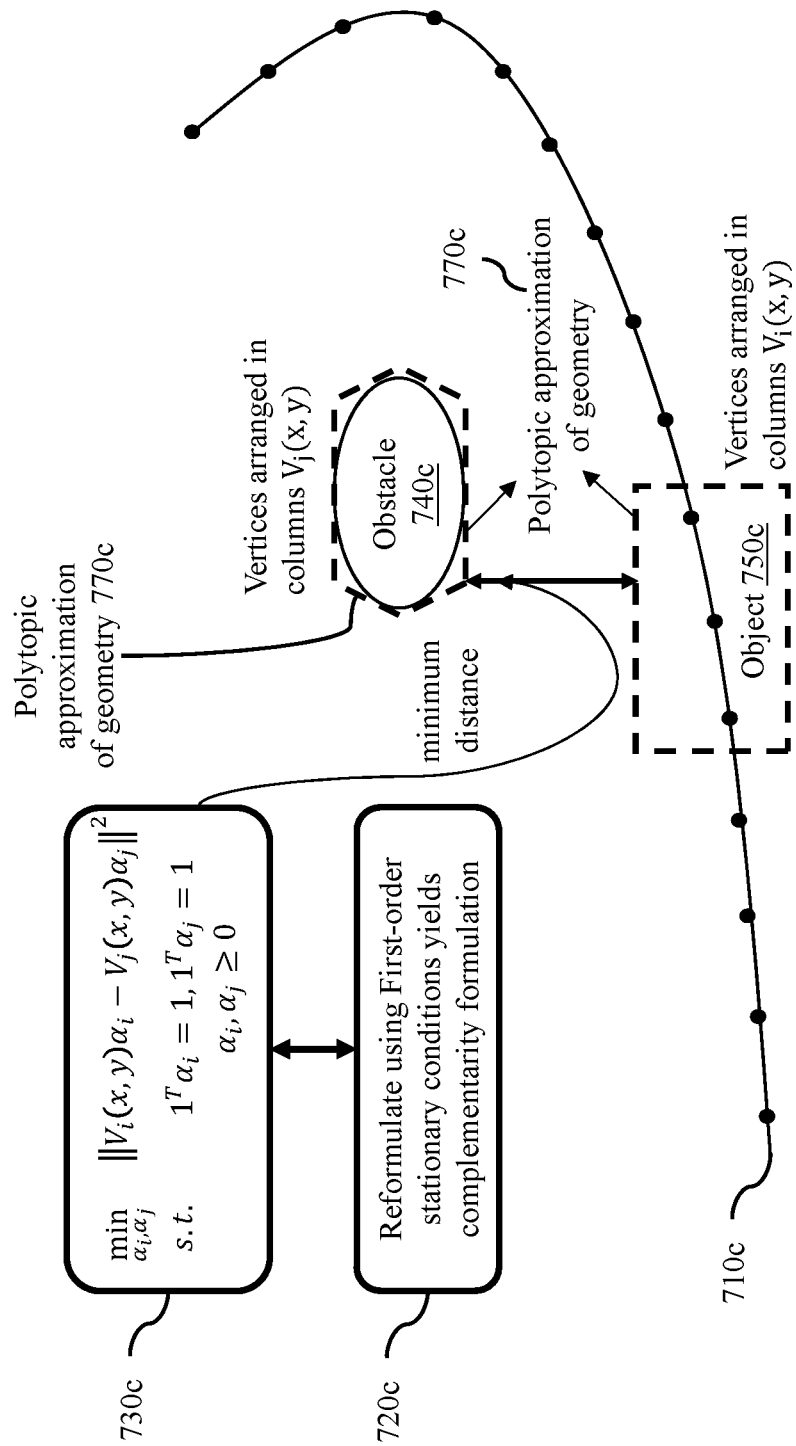
FIG. 7C shows a schematic for the formulation of the collision avoidance problem according to some embodiments.

FIG. 7C shows a schematic for the formulation of the collision avoidance problem according to some embodiments. The objective of the collision avoidance problem is to generate an optimal, collision-free trajectory 710c. The formulation presented in this disclosure considers a polytopic representation 770c for the object 750c and the obstacle 740c. The minimum distance function 730c can be formulated as a quadratic program using the polytopic representation of the obstacle and the object. Reformulating 720c using first order stationary conditions yields complementarity condition which can then be robustly solved by the optimization problem described in this disclosure.

Figure 7D:
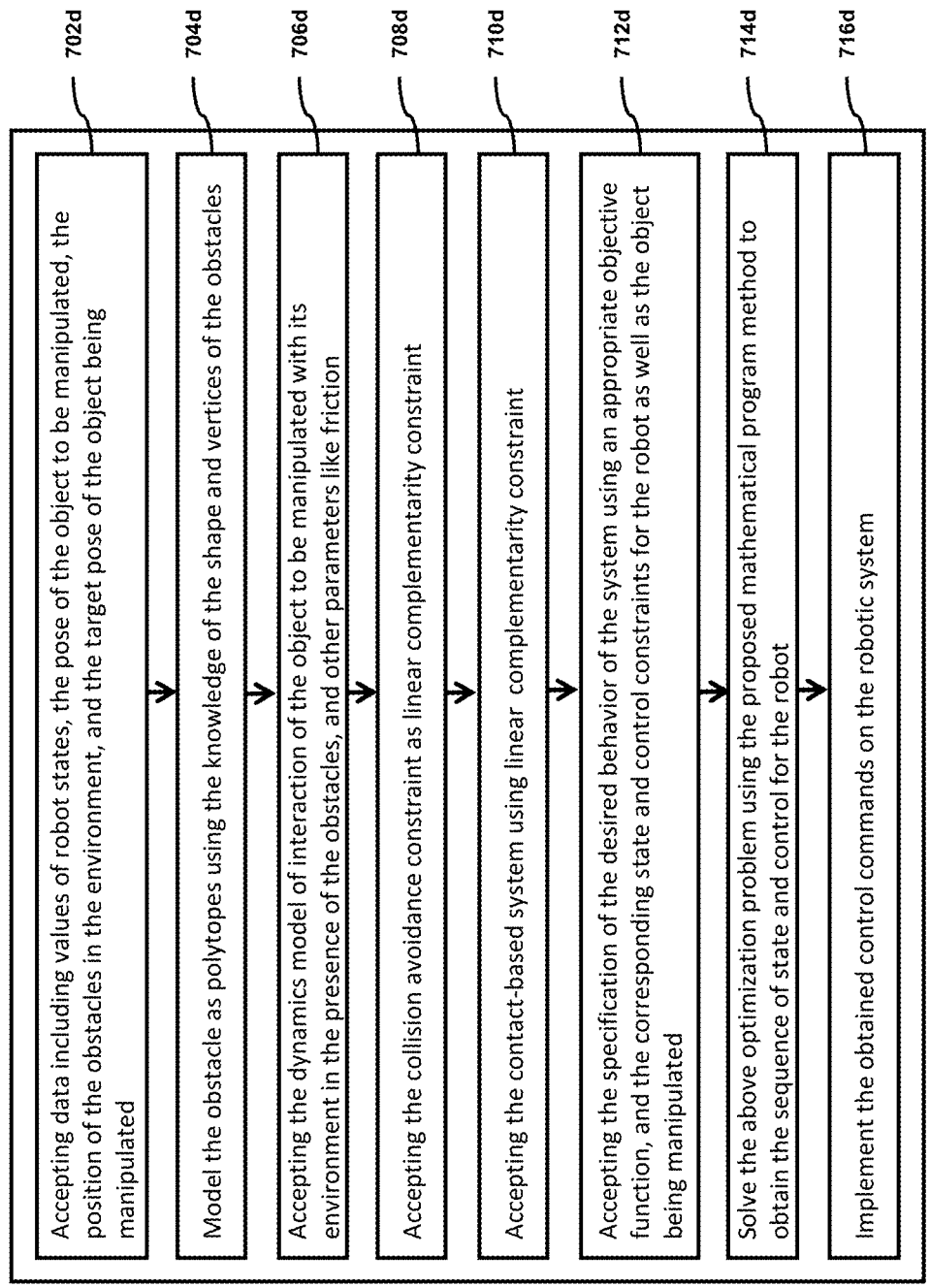
FIG. 7D illustrates an example method for controlling an object using a robot according to some example embodiments.

FIG. 7D illustrates an example method for controlling an object using a robot according to some example embodiments. At 702d, the method comprises, accepting data including values of robot states, the pose of the object to be manipulated, the position of the obstacles in the environment, and the target pose of the object being manipulated. Some of these data, for example the pose of the object to be manipulated, the position of the obstacles, may be obtained as three-dimensional information of the object and its surroundings. The target pose of the object may be provided along with the objective function, for example by a user or may be pre-defined in a database.

At 704d, the method comprises modelling the obstacle as polytopes using the knowledge of the shape and vertices of the obstacles. Using the data accepted at 702d, the obstacles may be modelled as per the illustrative schemes described with reference to FIGS. 5A-5D. A matrix of states of all points inside each of the polytopes may be accordingly defined.

At 706d, the method comprises accepting the dynamics model of interaction of the object to be manipulated with its environment in the presence of the obstacles, and other parameters like friction. As described previously, a description of the dynamics of the object to be manipulated may be provided by a user or may be fetched by a robotic manipulator from a database.

At 708d, the collision avoidance constraint may be accepted as linear complementarity constraint. For example, the formulation (1) and (2) may be determined to be the collision avoidance constraint. At 710d, description regarding the contact-based system may be accepted using linear complementarity constraint. That is, the minimization problem may be reposed as the formulation (3) that considers the parameterization of vertices of the polytopes At 712d, the method comprises accepting the specification of the desired behavior of the system using an appropriate objective function, and the corresponding state and control constraints for the robot as well as the object being manipulated. The objective function may define a minimum time problem associated with the task, a destination location for the object, or in some cases additionally the structure of the objective function (quadratic or non-linear).

At 714d, the method comprises solving the optimization problem for collision avoidance using the proposed mathematical program method (with reference to FIG. 3) to obtain the sequence of state and control for the robot. The non-smooth optimization problem is transformed using first order stationary conditions and then solved per the formulation (5) to obtain values for sequence of state and control for the robot.

At 716d, the method comprises implementing the obtained control commands on the robotic system (the robotic manipulator) to manipulate the object without colliding with any obstacle.

Figure 8A:
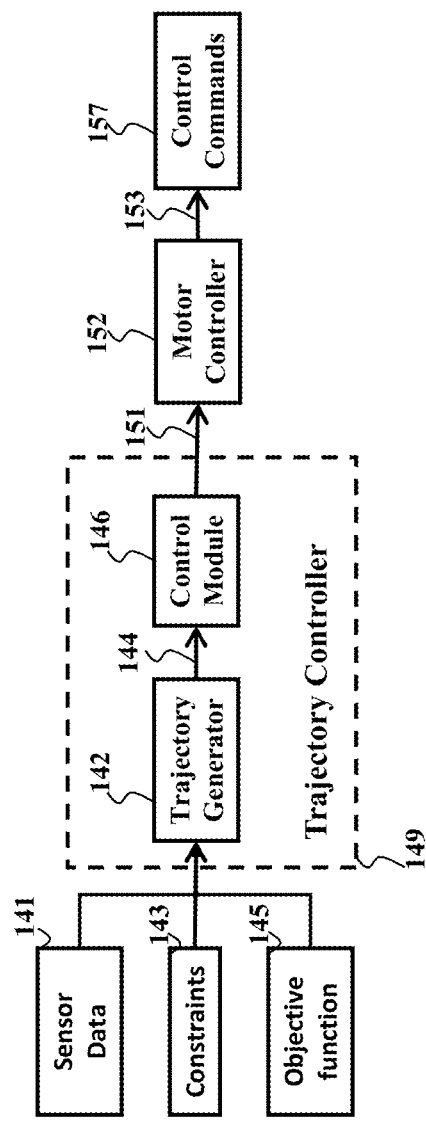
FIG. 8A is a flow diagram illustrating some steps used for implementing some methods associated with a robot device, according to some embodiments of the present disclosure.

FIG. 8A is a flow diagram illustrating some steps used for implementing some methods associated with a robot device, according to some embodiments of the present disclosure.

In some embodiment, the trajectory controller 149 consists of a trajectory generator 142 and a control module 146 which communicate via a communication channel 144. The static/dynamic obstacles as well as the workspace of the robot is sensed using sensor(s) like RGB-D cameras and/or LiDARs. The trajectory generator 142 is a computer software that uses the sensor data 141 from environment sensors as well as the set of constraints 143 (dynamics of the robot as well as the control and state limits for the robot) to optimize an objective function 145. The objective function 145 mathematically reflects the goal for the robot. In general, the objective function for the robot is defined as a sum of user-defined cost over the sequence of states and inputs for the trajectory. More concretely, for the trajectory $x_T=\{, x_1, \ldots, x_T\}$, $u_T=\{u_0, u_1, \ldots, u_{T-1}\}$, the objective function 145 is written as ., $J=\Sigma_k c(x_k, u_k)$, where $c(x_k, u_k)$ represents the cost function for state and control at the discrete time instant k. The trajectory generator optimizes this function by using the gradient of the objective, as well as the constraints at each of the collocation points along the trajectory. And generates the optimal trajectory 144 $x_T^*=\{x_0^*, x_1^*, \ldots, x_T^*\}$, $u_T^*=\{u_0^*, u_1^*, \ldots, u_{T-1}\}$. This trajectory is then passed along to the control module 146, which then communicates to the motor controller 152 of the joints of the robot via a communication channel 151. The motor controller then controls the joints of the robot by generating the desired torque 157 at every joint of the robot while communicating with the motor controller over channel 153. The states of the robot are monitored by the control module using the communication channel 159 using the encoders at every joint of the robot.

Figure 8B:
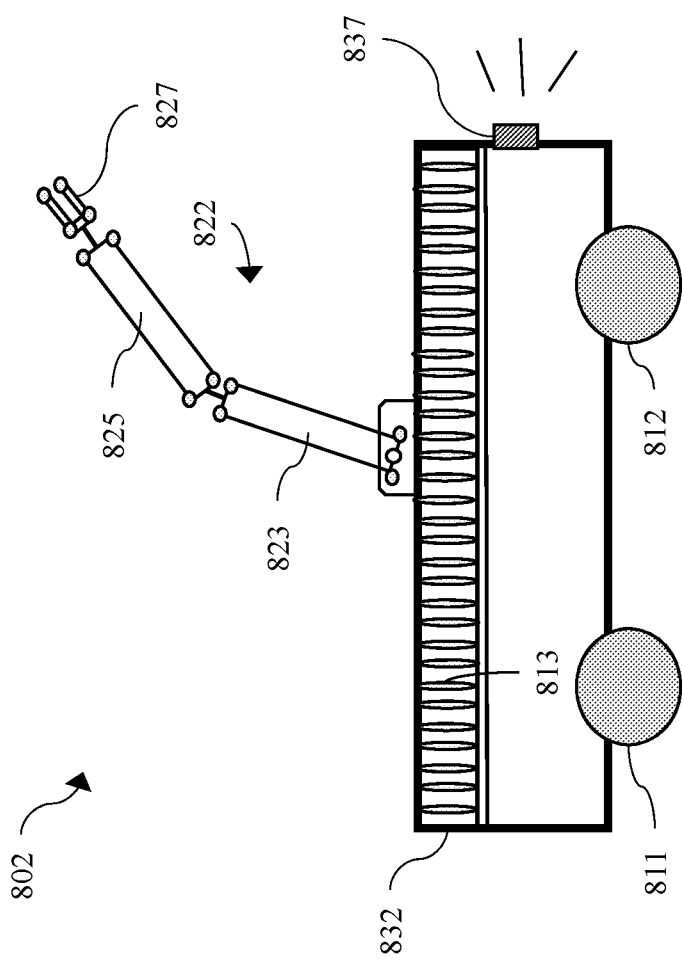
FIG. 8B depicts an exemplary holonomic cart containing a robotic manipulator operating according to some embodiments.

FIG. 8B depicts an exemplary holonomic cart containing a robotic manipulator operating according to some embodiments. In some embodiments, robot 802 having a moveable cart 832 has a robotic arm 822 with links 823, 825 and a gripper 827 mounted on the cart 832. The gripper 827 can grip objects within an environment. The cart 832 may contain one or more wheels 811, 812, which may be holonomic wheels that operate with two degrees of freedom. In further embodiments, a wrap around front conveyor belt 813 may be included on the holonomic cart 832. In some examples, the wrap around front conveyer belt 813 may allow the robot 802 to not have to rotate its gripper 827 to the left or right when unloading or loading boxes from or to a truck container or pallet (not shown). The mechanical system may include components including a robotic arm 822, a gripper 827, a conveyer belt 813, a (movable or holonomic) cart 832, and one or more wheels 811, 812. The sensing system can have one or more sensors attached to a robotic arm 822, such as 2D sensors and/or 3D depth sensors (not shown) that sense information about the environment as the robotic arm 822 moves. Further, lights 837 can be positioned on the front, side, back, underneath or anywhere on the cart 832 or gripper 827.

Figure 9:
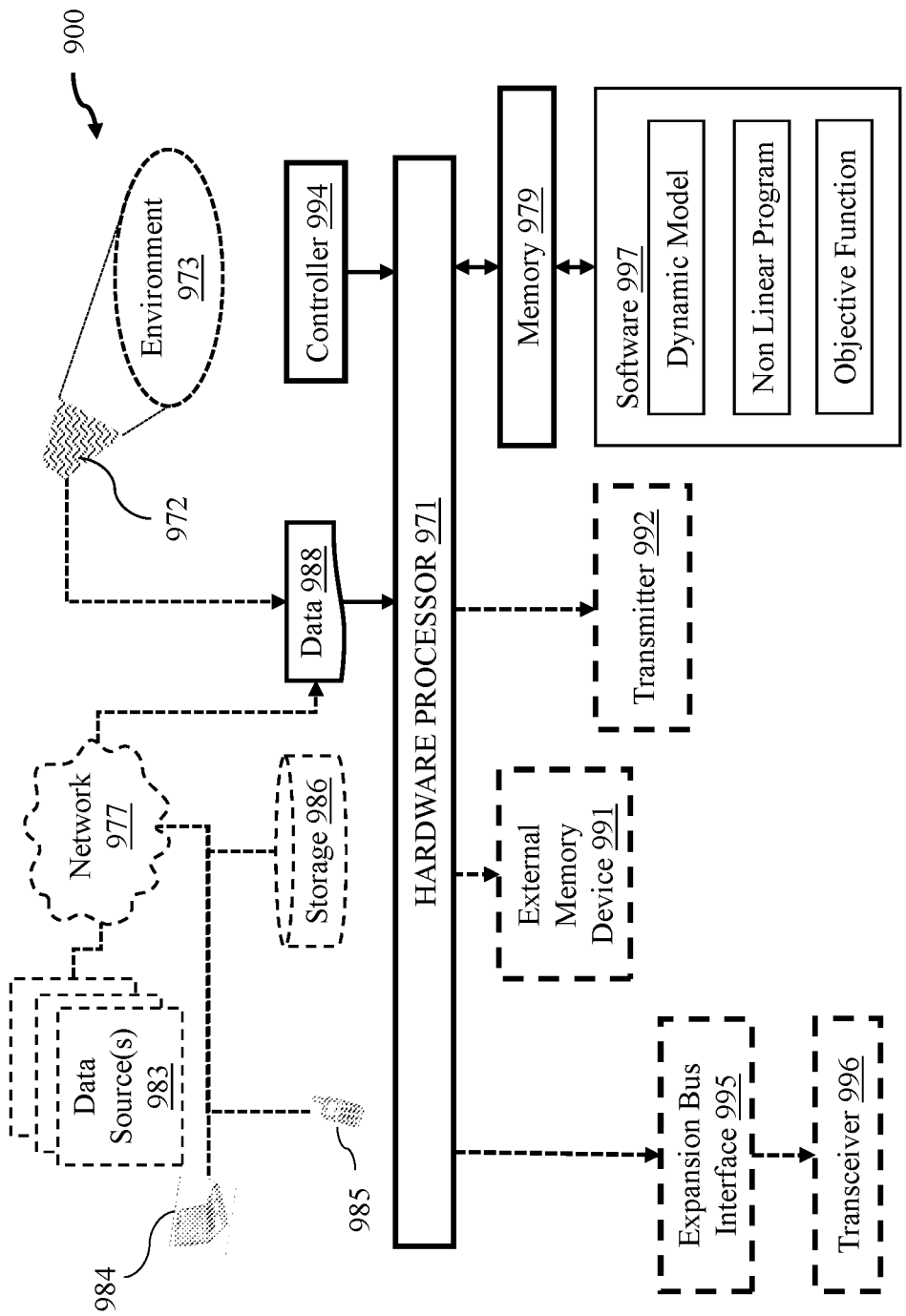
FIG. 9 is a block diagram illustrating some components of a data processing system used for implementing some methods, according to some embodiments of the present disclosure.

FIG. 9 is a block diagram illustrating some components of a data processing system used for implementing some methods, according to some embodiments of the present disclosure.

For example, data processing system 900 can include a hardware processor 971 in communication with a sensor 972 or sensors, that collects data including data of an environment 973. The sensor data can include data related to robot, vehicle, machine, etc. and similar types of data or data associated with trajectory optimization techniques for dynamical systems with nonlinear constraints. Further, the sensor 972 can convert a video or camera input into the signal data. The hardware processor 971 can be in communication with a computer storage memory, i.e. memory 979, such that the memory 979 includes stored data, including algorithms, instructions and other data, that can be implemented by the hardware processor 971. For example, stored in the memory can include a multi-link Dynamic Model, a nonlinear program and an objective function.

Still referring to FIG. 9, sensor data can be stored in the memory 979 which can be obtained from at least one sensor in the environment via a wired connection or a wireless connection, the sensor data is stored in the memory via a transceiver configured to output data and to receive data, such that after each time interval, the sensor data is updated by the at least one sensor. Also, stored in the memory can be robot, vehicle and machine operational and dynamics data that can include robot arm information including a model of the robot arm that allows for simulation of movements of the robot arm, along with operational control inputs such as torques applied by the motors via the robot drive for moving each joint of the robot arm. It is possible software 997 can be stored in the memory 979, such as multi-link dynamic model(s), nonlinear program(s), or objective function(s). The data stored can include robot, vehicle, machine, etc. or similar types of data or data associated with trajectory optimization techniques for dynamical systems with nonlinear constraints.

Optionally, the hardware processor 971 can be connected to a network 977, that is in communication with a data source(s) 983, a computer device 984, a mobile phone device 985 and a storage device 986. Also optionally, the hardware processor 971 can be connected via the network 977 to a network-enabled server (not shown) that is connected to a client device (not shown). The hardware processor 971 can optionally be connected to an external memory device 991, a transmitter 992 to a controller 994. A transceiver 996 can be connected via an expansion bus interface 995 to the hardware processor 971. Some types of output received by the transceiver 996 can be related to a user's intended interested in receiving an answer to a request (received by the transceiver 996) about computed trajectories along the path (obtained from the methods of the present disclosure) which could be displayed on the user's one or more display device, such as a monitor or screen, and/or inputted into an other computer related device for further analysis, etc.

Still referring to FIG. 9, contemplated is that the hardware processor 971 can include two or more hardware processors depending upon the requirements of the specific application, wherein the processors can be either internal or external. Certainly, other components may be incorporated.

It is possible the network 977 can include, by non-limiting example, one or more local area networks (LANs) and/or wide area networks (WANs). Wherein the networking environments can be similar to enterprise-wide computer networks, intranets and the Internet. Contemplated for all the components mentioned that there can be any number of client devices, storage components, and data sources employed within the systems of the present disclosure. Each may comprise a single device or multiple devices cooperating in a distributed environment. Further, the data source(s) 983 may comprise data resources for training a network. For example, in an embodiment, training data can be stored in the storage 986. The training data can also include signals of other environments. Data source(s) 983 may also comprise data resources for training a network. The data provided by data source(s) 983 may include other data, such as other sensor related data corresponding to the environment, robot arm and the like.

Still referring to FIG. 9, some data in data source(s) 983 can be provided by one or more feedback loops. Other examples of data sources may include by way of example, and not limitation, various sources including streaming video, web queries, mobile device camera or other information, web cam feeds, smart-glasses and smart-watch feeds, customer care systems, security camera feeds, web documents, catalogs, user feeds, SMS logs, instant messaging logs, spoken-word transcripts, gaining system user interactions such as voice commands or data (e.g., data can include robot, vehicle, environmental, etc. types of data or data associated with trajectory optimization techniques for dynamical systems with nonlinear constraints). Specific data source(s) 983 used may be determined based on the application including whether the data is a certain class of data (e.g., data relating to thresholds, performance, safety, etc. associated with robot, vehicle, environmental, etc. types of data or data associated with trajectory optimization techniques for dynamical systems with nonlinear constraints), or general (non-class-specific) in nature.

The third party devices 984, 985, which can comprise of any type of computing device including a computer device 984 or a mobile device 985. Contemplated is that a user device may be embodied as a personal data assistant (PDA), a mobile device, such as a smartphone, smart watch, smart glasses (or other wearable smart device), augmented reality headset, virtual reality headset. Further, the user device could be a laptop, such as a tablet, remote control, entertainment system, vehicle computer system, embedded system controller, appliance, home computer system, security system, consumer electronic device, or other similar electronics device. In one embodiment, the client device is capable of receiving input data such as audio and information usable by methods and systems of the present disclosure. For example, the third party device may be data i.e. data that is associated with robot, vehicle, environmental, etc. or similar types of data or data associated with trajectory optimization techniques for dynamical systems with nonlinear constraints), a microphone or line-in for receiving audio information, a camera for receiving video or image information, or a communication component (e.g., Wi-Fi functionality) for receiving such information from another source, such as the Internet or a data source.

Still referring to FIG. 9, the storage 986 can store information including data, computer instructions (e.g., software program instructions, routines, or services), and/or models used in embodiments of the technology described herein. For example, the storage 986 can store data from one or more data source(s) 983, one or more deep neural network models, information for generating and training deep neural network models, and the computer-usable information outputted by one or more deep neural network models.

Figure 10:
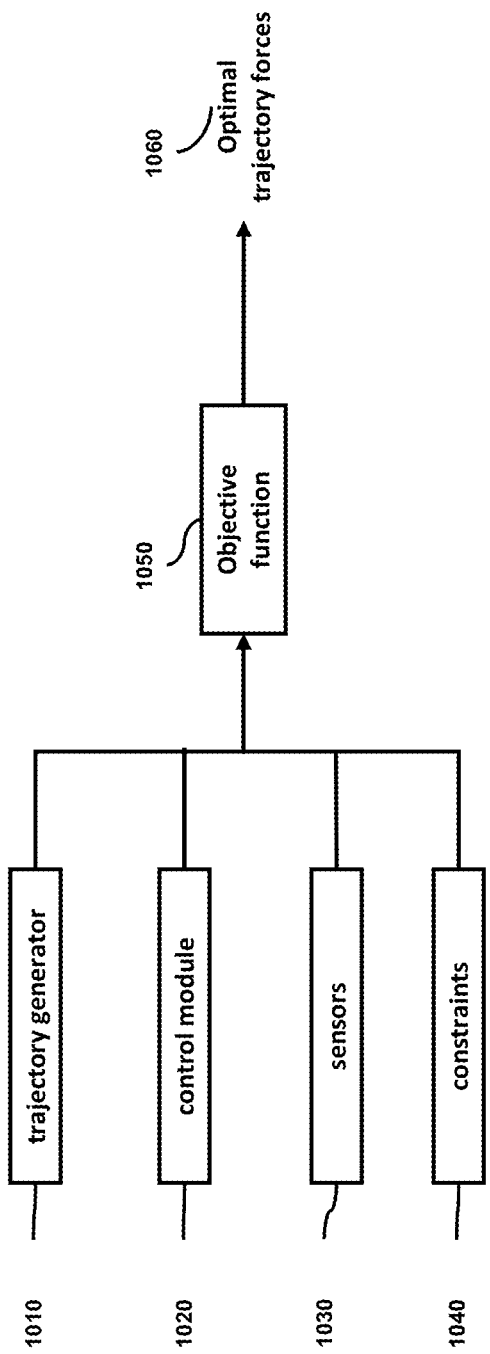
FIG. 10 is a flow diagram of some modules used for implementing a trajectory controller associated with a robot device, according to some embodiments.

FIG. 10 is a flow diagram of some modules used for implementing a trajectory controller associated with a robot device, according to some embodiments. In some embodiment, the trajectory controller includes a trajectory generator 1010 and a control module 1020 which communicate via a communication channel. The static/dynamic obstacles as well as the workspace of the robot is sensed using sensor(s) like RGB-D cameras and/or LiDARs. The trajectory generator 1010 is a computer software that uses the sensor data 1030 from environment sensors as well as the set of constraints 1040 (dynamics of the robot as well as the control and state limits for the robot) to optimize an objective function 1050. The objective function 1050 mathematically reflects the goal for the robot. In general, the objective function for the robot is defined as a sum of user-defined cost over the sequence of states and inputs for the trajectory. More conceretely, for the trajectory $x_T = \{x_1, \ldots, x_T\}$, $u_T = \{u_0, u_1, \ldots, u_{T-1}\}$, the objective function is written as $J = \Sigma_k c(x_k, u_k)$, where $c(x_k, u_k)$ represents the cost function for state and control at the discrete time instant k.

The trajectory generator optimizes this function by using the gradient of the objective, as well as the constraints at each of the collocation points along the trajectory. And generates the optimal trajectory 1060 $x_T^* = \{x_0^*, x_1^*, \ldots, x_T^*\}$, $u_T^* = \{u_0^*, u_1^*, \ldots, u_{T-1}^*\}$. This trajectory is then passed along to the control module 1020, which then communicates to the motor controller of the joints of the robot via a communication channel. The motor controller then controls the joints of the robot by generating the desired torque to track the trajectory 1060 at every joint of the robot while communicating with the motor controller over channel. The states of the robot are monitored by the control module using the communication channel using the encoders at every joint of the robot forming at least part of the sensors 1030.

Figure 11:
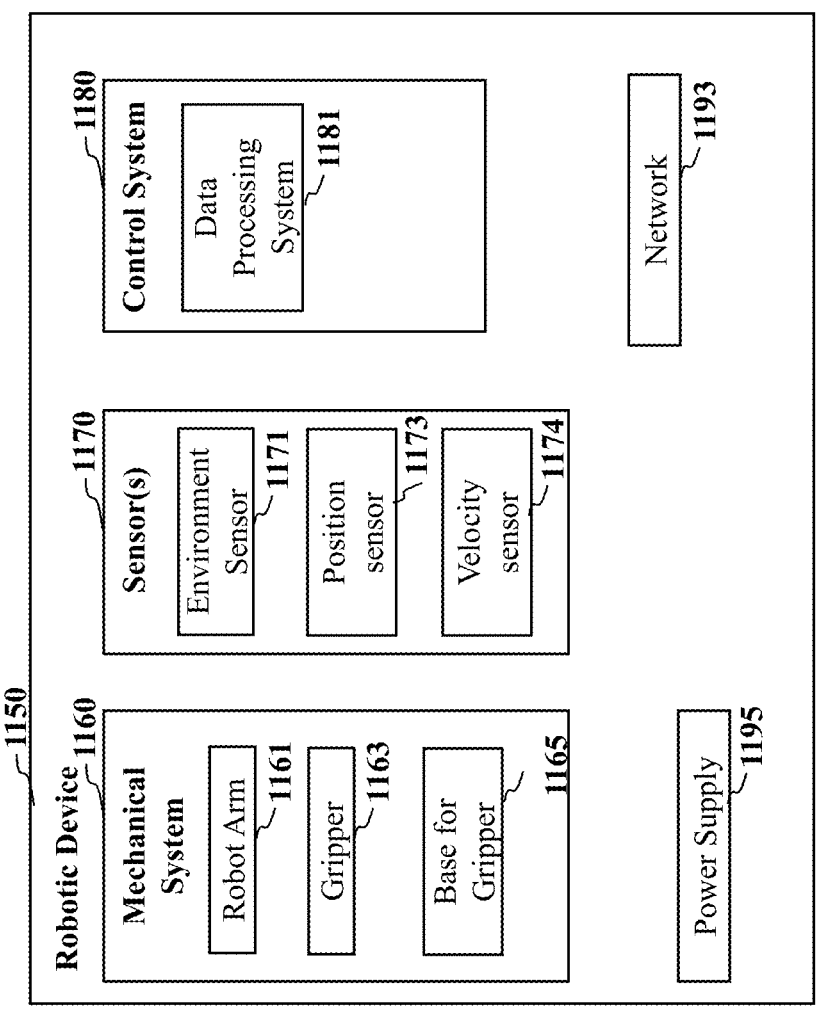
FIG. 11 is a block diagram illustrating some components used for implementing some methods, according to some embodiments of the present disclosure.

FIG. 11 is a block diagram illustrating some components used for implementing some methods, according to some embodiments of the present disclosure. According to embodiments of the present disclosure, the robotic device 1150 consists of mechanical system 1160, sensors 1170, control system 1180, network 1193 and power supply 1195. The mechanical system 1160 consist of robot arm 1161, gripper 1163 and base for gripper 1165. The sensors may consist of environment sensor 1171, position sensor 1173, and velocity sensor 1174. The control system consist of a data processing system 1181.

Figure 12:
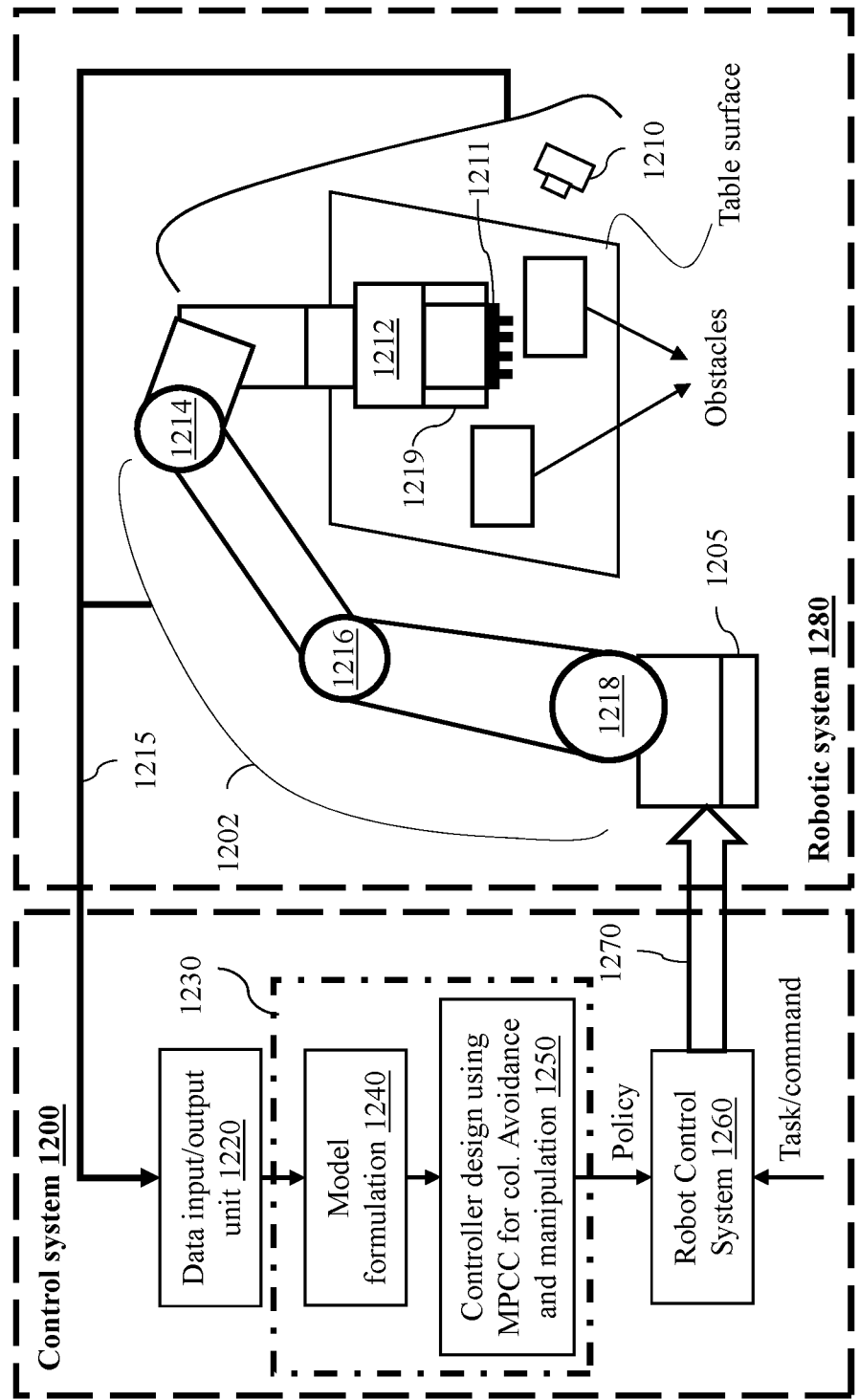
FIG. 12 is a diagram illustrating an example of a control system using a robot arm according to some embodiments.

FIG. 12 is a diagram illustrating an example of a control system using a robot arm according to some embodiments. In the following, the control system 1200 is described as an example that is applied to a robotic system 1280, however it should be noted that a control system and a computer-implemented method are not limited to the robotic systems. The robot arm 1202 is controlled using a robot control system 1260 that receives a command or task that may be externally supplied to the robot control system 1260. An example of the command or task could be touching or grasping an object 1211 to be manipulated near obstacles on a table surface using grippers 1212 of the robot arm 1202. The robot control system 1260 sends a control signal 1270 to the manipulator 1205 of the robotic system 1280. The control signal 1270 could be the torques to be applied at each of the joints 1214, 1216, 1218 of the robot arm 1202, and opening/closing of the gripper 1212. The state of the robotic system 1280 is derived using sensors. These sensors may include encoders at the joints of the robot 1214, 1216, 1218, and a camera 1210 that can observe the environment of the robot and tactile sensors that can be attached to the fingers 1219 of the gripper 1212. The state measurements 1215 from the sensors are sent to a data input/output unit 1220 which stores the data received from the sensors. The robot control system 1260 is said to execute a policy to achieve some task or command. A program 1230 takes the input from data input/output unit 1220 to determine an update to the control policy using a model formulation algorithm 1240 and a control design using MPCC for collision avoidance and manipulation algorithm 1250. The updated policy is then sent to the robot control system 1260. The policy robot control system 1260 can also control the amount of opening or closing of the gripper finger 1219. The amount of closing, or strength of the grasp, can be determined by the control policy. In the preferred embodiment the grasp strength is determined from the tactile sensor signals, which are part of the state measurements 1215 from the sensors.

In the preferred embodiment the camera 1210 is an RGBD camera which can supply both an RGB color image and a depth image. The internal information from the RGBD camera can be used to convert the depth into a 3D point cloud. In another embodiment the camera can be a stereo camera, consisting of two color cameras for which depth and 3D point cloud can be computed. In yet another embodiment the camera can be a single RGB camera, and 3D point cloud can be estimated directly using machine learning. In another embodiment, there could be more than one camera 1210.

Finally, in another embodiment the camera 1210 can be attached at some point on the robot arm 1202, or gripper 1212.

Figure 13:
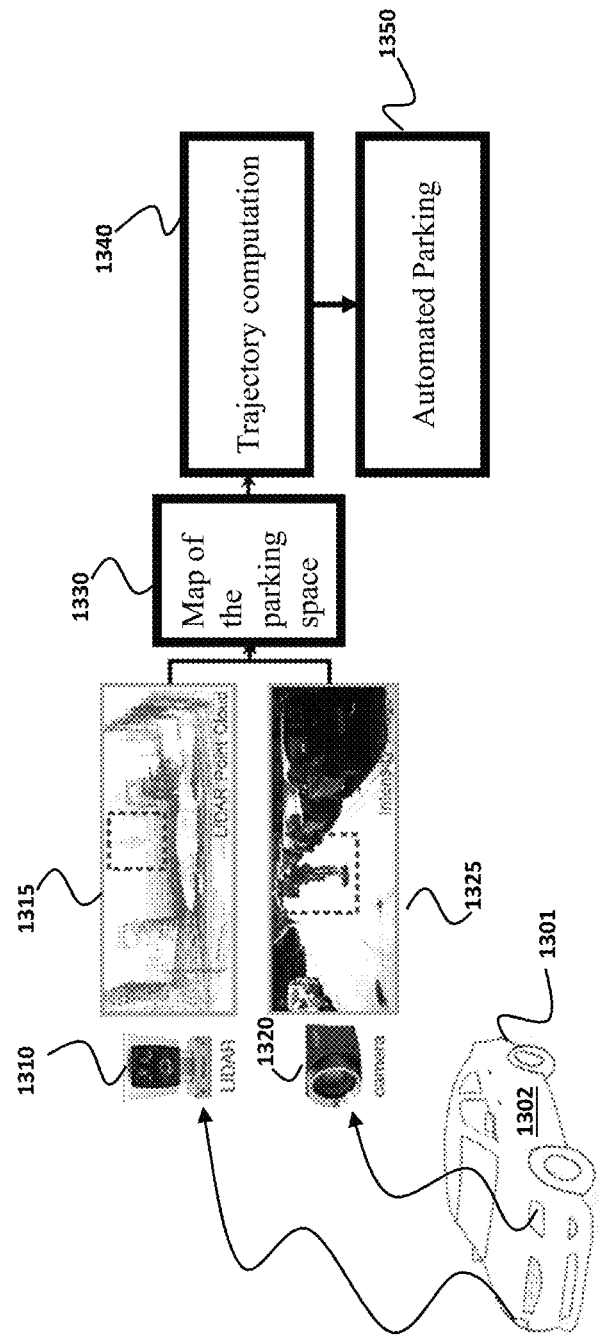
FIG. 13 shows a schematic of a system according to one embodiment.

FIG. 13 shows a schematic of a system according to one embodiment. The system includes a vehicle 1301 including a processor 1302 configured for performing an automated parking 1350. The vehicle also includes at least one sensor, such as a LIDAR 1310 and/or a camera 1320. The LIDAR sensor 1310 is the low-resolution first sensor and the camera 1320 is the high-resolution second sensor. The sensor 1310 and/or 1320 is operatively connected to the processor 1302 and is configured for sensing information 1315 and 1325 indicative of the geometry of at least part of the parking space. Using this information, the processor 1302 determines and/or updates the map 1330 of the parking space. To that end, the processor 1302 performs the automated parking 1350 by trajectory computation 1340 using the map 1330.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A controller for controlling a motion of an object performing a task for changing a state of the object from a start state to an end state while avoiding collision of the object with an obstacle, comprising: at least one processor; and a memory having instructions stored thereon that, when executed by the at least one processor, cause the controller to:

obtain data indicative of dynamics of the object and the obstacle, and geometry of the object and the obstacle, wherein the geometry of the object includes a convex shape enclosing an actual shape of the object and the geometry of the obstacle includes a convex shape enclosing an actual shape of the obstacle, wherein each of the convex shapes of the object and the obstacle is a polytope defined by a set of vertices, wherein points within the polytope of the object are defined as weighted combinations of the vertices of the polytope of the object, and wherein points within the polytope of the obstacle are defined as weighted combinations of the vertices of the polytope of the obstacle;

solve an optimization problem of the dynamics of the object producing an optimal trajectory for performing the task subject to constraints on a solution of first-order stationary conditions modeling a minimum distance between the convex shape of the object and the convex shape of the obstacle using complementarity constraints, wherein the complementarity constraints are imposed on the weights for the vertices of the polytopes of the object and the obstacle to enforce the minimum distance between the object and the obstacle; and control the motion of the object according to the optimal trajectory.

2. The controller of claim 1, wherein the data corresponding to the dynamics of the object includes a set of equations that describe a change of the state of the object in response to applying one or more forces of an actuator of the object, wherein the data corresponding to the dynamics of the obstacle includes a trajectory of the obstacle defining a state of the obstacle as a function of time, wherein the weights governed by the complementarity constraints are independent of the state of the object and the state of the obstacle, wherein the optimization problem models the minimum distance by changing locations of the vertices of the polytopes of the object and the obstacle in accordance with their corresponding states.

3. The controller of claim 1, wherein the controller is configured to solve the optimization problem as a Mathematical Program with Complementarity Constraints (MPCC), wherein the solution of the optimization problem optimizes an objective function defining one or more of a minimum time problem, object manipulation problem, or a mathematical structure of the objective function.

4. The controller of claim 1, wherein the controller is further configured to receive constraints pertaining to the collision avoidance with the minimum distance, wherein the constraints pertaining to the collision avoidance comprise one or a combination of path constraints of the object and distance constraints of the object and the obstacle.

5. The controller of claim 1, wherein to control the motion of the object, the controller is further configured to generate control commands directing at least one actuator to move the object to follow the optimal trajectory.

6. The controller of claim 5, wherein the controller is further configured to cause the actuator to generate optimal trajectory forces.

7. The controller of claim 1, wherein the complementarity constraints comprise constraints corresponding to multi-body interactions of the object.

8. The controller of claim 1, wherein to control the motion of the object to achieve a task of autonomous assembly is performed by controlling desired contact states of the object with an environment of the object using the complementarity constraints expressed as complementarity conditions, and an undesired collision with the environment of the object is avoided by modeling a minimum distance function represented as the complementarity conditions.

9. The controller of claim 1, wherein the minimum distance between a convex hull of the object and a convex hull of the obstacle is defined as:

$\min \|q_i - q_j\|^2$; subject to $q_i \in O_i(t)$ and $q_j \in O_j(t)$, wherein: $O_i(t)$ corresponds to a polytope modeling the convex shape of the object at a time instance t, and $O_j(t)$ corresponds to a polytope modeling the convex shape of the obstacle at the time instance t.

10. A method for controlling a motion of an object performing a task changing a state of the object from a start state to an end state while avoiding collision of the object with an obstacle, wherein the method uses a processor coupled with stored instructions implementing the method, wherein the instructions, when executed by the processor carry out steps of the method, comprising:
obtaining data indicative of dynamics of the object and the obstacle, and geometry of the object and the obstacle, wherein the geometry of the object includes a convex shape enclosing an actual shape of the object and the geometry of the obstacle includes a convex shape enclosing an actual shape of the obstacle, wherein each of the convex shapes of the object and the obstacle is a convex hull defined by a set of inequalities defining points within the convex hull of the object and a set of inequalities defining points within the convex hull of the obstacle;
solving an optimization problem of the dynamics of the object producing an optimal trajectory for performing the task subject to constraints on a solution of first-order stationary conditions modeling a minimum distance between the convex shape of the object and the convex shape of the obstacle using complementarity constraints, wherein the complementarity constraints are imposed on the sets of inequalities of the object and the obstacle to enforce the minimum distance between the object and the obstacle; and
controlling the motion of the object according to the optimal trajectory.

11. The method of claim 10, wherein the data corresponding to the dynamics of the object includes a set of equations that describe a change of the state of the object in response to applying one or more forces of an actuator of the object, wherein the data corresponding to the dynamics of the obstacle includes a trajectory of the obstacle defining a state of the obstacle as a function of time, wherein the weights governed by the complementarity constraints are independent of the state of the object and the state of the obstacle, wherein the optimization problem models the minimum distance by changing locations of the vertices of the polytopes of the object and the obstacle in accordance with their corresponding states.

12. The method of claim 10, wherein the complementarity constraints comprise constraints corresponding to multibody interactions of the object.

13. A non-transitory computer-readable storage medium embodied thereon a program executable by a processor for performing a method for controlling a motion of an object performing a task changing a state of the object from a start state to an end state while avoiding collision of the object with an obstacle, the method comprising:
obtaining data indicative of dynamics of the object and the obstacle, and geometry of the object and the obstacle, wherein the geometry of the object includes a convex shape enclosing an actual shape of the object and the geometry of the obstacle includes a convex shape enclosing an actual shape of the obstacle, wherein each of the convex shapes of the object and the obstacle is a polytope defined by a set of vertices, wherein points within the polytope of the object are defined as weighted combinations of the vertices of the polytope of the object, and wherein points within the polytope of the obstacle are defined as weighted combinations of the vertices of the polytope of the obstacle;
solving an optimization problem of the dynamics of the object producing an optimal trajectory for performing the task subject to constraints on a solution of first-order stationary conditions modeling a minimum distance between the convex shape of the object and the convex shape of the obstacle using complementarity constraints, wherein the complementarity constraints are imposed on the weights for the vertices of the polytopes of the object and the obstacle to enforce the minimum distance between the object and the obstacle; and
controlling the motion of the object according to the optimal trajectory.

* * * * *